United States Patent
Ge et al.

(10) Patent No.: US 11,256,868 B2
(45) Date of Patent: Feb. 22, 2022

(54) ARCHITECTURE FOR RESOLVING AMBIGUOUS USER UTTERANCE

(71) Applicant: Microsoft Technology Licensing, LLC, Redmond, WA (US)

(72) Inventors: Jiayin Ge, Bellevue, WA (US); Jianshu Ji, Bothell, WA (US); Guihong Cao, Sammamish, WA (US); Zicheng Huang, Bothell, WA (US); Mridu Baldevraj Narang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 16/430,280

(22) Filed: Jun. 3, 2019

(65) Prior Publication Data
US 2020/0380077 A1 Dec. 3, 2020

(51) Int. Cl.
*G10L 15/22* (2006.01)
*G06F 16/33* (2019.01)
(Continued)

(52) U.S. Cl.
CPC ............ *G06F 40/30* (2020.01); *G06F 16/338* (2019.01); *G06F 16/3325* (2019.01); *G06F 16/3329* (2019.01); *G06F 16/3344* (2019.01); *G06F 40/253* (2020.01); *G06F 40/295* (2020.01); *G10L 15/1815* (2013.01);
(Continued)

(58) Field of Classification Search
None
See application file for complete search history.

(56) References Cited

U.S. PATENT DOCUMENTS 7,283,958 B2 10/2007 Azara et al.
8,457,950 B1 6/2013 Gardner et al.
(Continued)

FOREIGN PATENT DOCUMENTS

WO 2013155619 A1 10/2013

OTHER PUBLICATIONS

"International Search Report & Written Opinion issued in PCT Application No. PCT/US20/029191", dated Jul. 17, 2020, 11 Pages..
(Continued)

*Primary Examiner* — Richard Z Zhu
(74) *Attorney, Agent, or Firm* — Medley, Behrens & Lewis, LLC

(57) ABSTRACT

A method of disambiguating user queries in a multi-turn dialogue including a set of user utterances. The method includes using a predefined language model to recognize an ambiguous entity in an unresolved user utterance from the multi-turn dialogue, and using the predefined language model to recognize entity constraints of the ambiguous entity. The method further includes, in a computer-accessible conversation history of the multi-turn dialogue, searching a set of previously-resolved entities for a candidate entity having entity properties with a highest confidence correspondence to the entity constraints of the ambiguous entity. The unresolved user utterance is rewritten as a rewritten utterance that replaces the ambiguous entity with the candidate entity. The rewritten utterance is output to one or more query answering machines.

20 Claims, 20 Drawing Sheets

(51) Int. Cl.
  *G06F 40/30*      (2020.01)
  *G06F 16/332*     (2019.01)
  *G06F 16/338*     (2019.01)
  *G06F 40/253*     (2020.01)
  *G06F 40/295*     (2020.01)
  *G10L 15/18*      (2013.01)
  *G06F 40/35*      (2020.01)
  *G06F 40/279*     (2020.01)

(52) U.S. Cl.
  CPC ...... *G06F 16/3322* (2019.01); *G06F 16/3349* (2019.01); *G06F 40/279* (2020.01); *G06F 40/35* (2020.01); *G10L 15/1822* (2013.01); *G10L 15/22* (2013.01); *G10L 15/222* (2013.01)

(56) References Cited

U.S. PATENT DOCUMENTS

| | | | |
|---|---|---|---|
| 8,577,671 B1* | 11/2013 | Barve | G06F 16/2457 704/9 |
| 8,706,503 B2* | 4/2014 | Cheyer | G10L 15/26 704/275 |
| 8,712,758 B2 | 4/2014 | Crouch et al. | |
| 9,922,642 B2* | 3/2018 | Pitschel | G10L 15/063 |
| 10,304,444 B2 | 5/2019 | Mathias et al. | |
| 10,418,032 B1* | 9/2019 | Mohajer | G06F 16/3329 |
| 10,958,599 B1* | 3/2021 | Penov | G10L 15/02 |
| 2003/0214523 A1* | 11/2003 | Wang | G06K 9/033 715/700 |
| 2005/0137855 A1* | 6/2005 | Maxwell, III | G06F 40/56 704/9 |
| 2015/0039292 A1* | 2/2015 | Suleman | G06F 16/285 704/9 |
| 2015/0340033 A1* | 11/2015 | Di Fabbrizio | G10L 15/22 704/254 |
| 2016/0042735 A1* | 2/2016 | Vibbert | G10L 15/222 704/257 |
| 2016/0163311 A1 | 6/2016 | Crook et al. | |
| 2016/0188565 A1* | 6/2016 | Robichaud | G06F 16/3334 704/9 |
| 2016/0379106 A1* | 12/2016 | Qi | G06F 40/295 706/11 |
| 2018/0052842 A1 | 2/2018 | Hewavitharana et al. | |
| 2018/0189267 A1 | 7/2018 | Takiel | |
| 2018/0232563 A1* | 8/2018 | Albadawi | G06K 9/726 |
| 2018/0285444 A1 | 10/2018 | Joshi et al. | |
| 2019/0012373 A1 | 1/2019 | Malik et al. | |
| 2019/0066668 A1 | 2/2019 | Lin et al. | |

OTHER PUBLICATIONS

"US Non Provisional Application Filed under U.S. Appl. No. 15/844,347", filed Dec. 15, 2017, 48 Pages.

* cited by examiner

ARCHITECTURE FOR RESOLVING AMBIGUOUS USER UTTERANCE

BACKGROUND

Automated assistant systems are used to interact with users via natural language, for example, to answer queries. However, user utterances may include ambiguities, which may make processing the user utterances difficult or impossible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

User queries in a multi-turn dialogue including a set of user utterances are disambiguated using a predefined language model that recognizes an ambiguous entity in an unresolved user utterance from the multi-turn dialogue. The predefined language model is used to recognize entity constraints of the ambiguous entity. In a computer-accessible conversation history of the multi-turn dialogue, a set of previously-resolved entities is searched for a candidate entity having entity properties with a highest confidence correspondence to the entity constraints of the ambiguous entity. The unresolved user utterance is rewritten as a rewritten utterance that replaces the ambiguous entity with the candidate entity. The rewritten utterance is output to one or more query answering machines.

BRIEF DESCRIPTION OF THE DRAWINGS

FIGS. 2A-2M show exemplary runtime states for exemplary conversations associated with different speech acts.

DETAILED DESCRIPTION

Figure 1A:
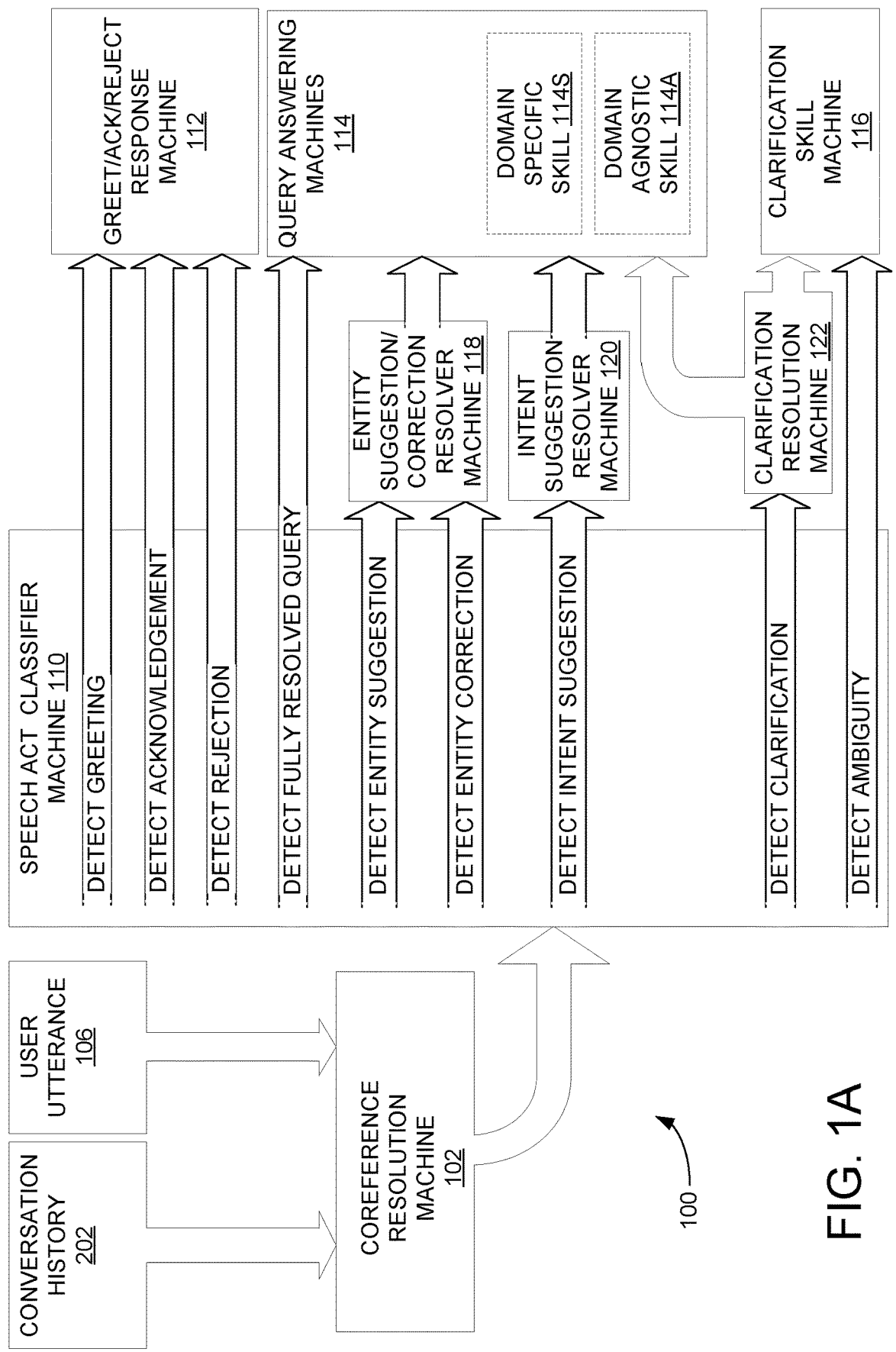
FIG. 1A shows an architecture for processing user utterances.

Automated agent systems may enable users to interact with computer devices via natural language. For example, users may issue commands or queries via natural language utterances, and an automated agent system may control computer devices to respond to the natural language commands/queries. Automated agent systems may be configured to process natural language utterances in the form of computer-readable text, parse trees, or other computer-readable data structures. In some examples, users may interact with automated agent systems by sending utterance text, e.g., text entered at a keyboard or any other suitable input device. In some examples, users may interact with automated agent systems by audible speech, e.g., received at a microphone associated with an automated agent system and processed by any suitable speech-to-text technology. Similarly, the automated agent system may output utterances to convey information to the user in any suitable form, for example, by outputting text to a display device, and/or by outputting audible speech via a speaker.

In some examples, a user utterance defines a query, representing a question to be answered by an automated agent system. Automated agent systems may answer a variety of different questions, including domain-specific queries (e.g., sports questions, movie questions, geopolitical news questions) and/or domain-agnostic queries (e.g., web search). For example, automated agent systems may be trained to recognize a specific domain for a query (e.g., sports) and answer the query using a domain-specific approach (e.g., looking up relevant scores and highlights from a sports game). In other examples, automated assistant systems may not recognize a specific domain for a query and may answer the query using a general, domain-agnostic approach (e.g., sending the query text to a web search engine in order to receive web search results pertaining to the query text).

In some examples, a user utterance may define a query by including a query intent and one or more query entities. For example, a query may represent a question about the one or more query entities, where the question is defined by the query intent. "Entities" as used herein may include people, places, things, companies, concepts (e.g., "the weather"), animals (e.g., an animal species or a specific animal), etc. In some examples, a query intent may include one or more properties of the query entities, e.g., intended content of an answer to the query. For example, if a user asks, "Who founded Microsoft?" the query contains one entity: "Microsoft" and a related intent to query the "founder of company" property for the "Microsoft" entity. A query intent may be associated with any relevant words from the user utterance, for example, the words "the founder of," are relevant to the "founded" property. Query intents may be expressed in various ways by verbs, adjectives, and/or nouns of a user utterance, for example, the same query intent regarding the "Microsoft" entity could be defined by a different query: "Who were the founders of Microsoft?"

In some examples, a user utterance may be one utterance of a multi-turn dialogue between one or more users and an automated agent. The user utterance may be contextually related to other utterances in a computer-accessible conversation history of the multi-turn dialogue, e.g., previous utterances by the user(s) and/or by the automated agent. As such, the user utterance may be ambiguous without contextualizing information provided by the other utterances in the computer-accessible conversation history. As an example, the user utterance may refer to a previously-discussed entity via a coreference such as a pronoun or a partial name. In the example described above, in response to the query "Who founded Microsoft?" the automated agent may respond, "Bill Gates and Paul Allen." If the user then issues another query, "What is Bill's net worth?" the automated agent may use the methods of the present disclosure to deduce that the user wishes to know Bill Gates' net worth. However, without the context provided by the first query ("Who founded Microsoft?") and the automated agent's reply ("Bill Gates and Paul Allen") the query "What is Bill's net worth?"

would be ambiguous, namely since the partial name "Bill" is not sufficiently specific as to which "Bill" the user is asking about.

Accordingly, FIG. 1 shows an exemplary dataflow architecture 100 for resolving ambiguities in user utterances in a multi-turn dialogue. Dataflow architecture 100 conceptually works by resolving any coreferences in a user utterance 106 in a coreference resolution machine 102, classifying a speech act represented by the user utterance, and delegating further handling of the user utterance to one or more downstream machines based on the detected speech act. However, such a dataflow is in no way limiting, and other dataflows may be used. In some examples, handling the detected speech act further includes resolving one or more ambiguities from the user utterance, when such ambiguities are present even after the resolution of coreferences. For example, an ambiguous suggestion to discuss a new topic may be resolved to a fully-resolved query. In some examples, the resolution of ambiguities is fully automated based on a context provided by a computer-accessible conversation history of the multi-turn dialogue. In some examples, the resolution of ambiguities includes asking the user a clarifying question and receiving a clarifying response. In any case, after resolving ambiguities in the user utterance (e.g., via coreference resolution, resolving an ambiguous suggestion to discuss a new topic, or asking a clarifying question) a rewritten utterance may be output to one or more downstream query answering machines for further processing. The rewritten utterance is a fully-resolved query that defines all information needed for handling the query, so that further processing of the computer-accessible conversation history may not be necessary for handling the rewritten utterance. Dataflow architecture 100 and/or other suitable dataflow architectures may be used in any suitable scenario involving natural language interaction with a user, for example to provide an automated agent.

The one or more query answering machines may return a plurality of different answers to a given query. In some examples, dataflow architecture 100 may be configured to obtain such a plurality of different answers and select one or more answers for providing to a user via an automated agent response. For example, the different answers may each have an associated confidence value assessed by the query answering machines, and one answer may be selected based on having a highest confidence value, or two answers may be selected and presented as possibilities.

Components of the dataflow architecture 100 may be implemented using any suitable combination of state-of-the-art and/or future machine learning and/or natural language technologies. In some examples, decisions, scores, and any other calculations described herein may be implemented via a predefined language model. The predefined language model may be implemented via any combination of machine learning, artificial intelligence, and/or statistical models, for example via discriminative and/or generative models. Exemplary models are described further below with regard to FIG. 7. The predefined language model may be trained using any suitable procedure with regard to any suitable objective function, for example with regard to user satisfaction in responding to user utterances. For example, the predefined language model may be trained via supervised training using labeled data examples from historical conversations, and/or reinforcement training based on user feedback data. The predefined language model may be trained in an "end-to-end" fashion so that all of the components described herein are simultaneously optimized with regard to the combined functionality of the dataflow architecture 100 and/or automated agent system(s) implemented using the dataflow architecture 100. In some examples, the predefined language model may include one or more knowledge bases, databases, and/or search engine tools configured to dynamically retrieve information pertaining to an entity, intent, and/or natural language phrase. For example, the predefined language model may include a knowledge base containing information about people, organizations, and the like, and including entity properties, relationships between entities, etc.

Dataflow architecture 100 includes a speech act classifier machine 110 configured to detect a plurality of different predefined speech acts in a user utterance 106, with regard to a conversation history 202. As each new user utterance 106 is processed, the conversation history 202 is updated to reflect the conversation so far. Before classification by speech act classifier machine 110, the user utterance 106 may be pre-processed by a coreference resolution machine 102 to resolve any ambiguous coreferences present in the user utterance 106 (e.g., ambiguous pronouns, partial names, etc.). Coreference resolution machine 102 is described further with regard to FIGS. 2C-2F and 3.

For example, as shown in FIG. 1A, speech act classifier machine 110 may use a predefined language model to detect predefined speech acts including "greeting," "acknowledgement," "rejection," "fully resolved query," "entity suggestion," "entity correction," "intent suggestion," "clarification," and "ambiguity." Based on the detection of a particular predefined speech act, speech act classifier machine 110 is configured to delegate further processing of the user utterance to one or more downstream operators, including greeting/acknowledgment/rejection response machine 112, entity suggestion/correction resolver machine 118, intent suggestion resolver machine 120, clarification skill machine 116, clarification resolution machine 122, and query answering machine(s) 114. These downstream operators, as well as coreference resolution machine 102 and speech act classifier machine 110 may be implemented on any suitable computer device or combination of computer devices. For example, the machines described herein may be implemented in an integrated computing device having a single enclosure, as separate processing nodes in a cloud computing scenario, or in any other suitable manner.

"Greeting," "acknowledgement," and "rejection" are exemplary speech acts in which a user greets an automated agent, provides acknowledgment (e.g., confirmation) of a response by the automated agent, or rejects a response by the automated agent. Responsive to detecting one of these speech acts, the speech act classifier machine 110 may delegate handling of the user utterance 106 to a greeting/acknowledgment/rejection response machine 112, which is described further below with regard to FIG. 2B.

"Fully resolved query" speech acts include any user utterances that fully define a query for processing by a downstream query answering machine. In other words, "fully resolved query" speech acts are user utterances that do not have any ambiguities and that do not rely on context of a conversation history for processing. Responsive to detecting a fully resolved query, the speech act classifier 110 may delegate handling of the user utterance 106 to a query answering machine 114 configured to return an answer to a query in the user utterance 106. Query answering machines 114 may be configured to respond to only fully-defined queries that explicitly mention any relevant entities, query intents, etc. Query answering machines 114 can include domain-specific skills 114S, for example, a domain-specific skill for sports queries or a domain-specific skill for celebrity queries. Query answering machines 114 can alternately or additionally include domain-agnostic skills, e.g., a web-search skill for answering arbitrary queries via web search.

"Entity suggestion" and "entity correction," speech acts are utterances in which a user wishes to change the topic to discuss a different entity, with regard to a query intent that was established by a previous user or agent utterance. An "entity suggestion" or "entity correction" utterance is not a fully-defined query by itself, as the requested change in topic is with regard to a context established in the conversation history 202. Responsive to detecting an entity suggestion or an entity correction, the speech act classifier machine 110 may delegate handling of the user utterance 106 to an entity suggestion/correction resolver machine 118 configured to rewrite the query in an unambiguous way that incorporates any relevant information from the conversation history 202, and in turn to delegate handling of the rewritten query to query answering machines 114. Entity suggestion/correction resolver machine 118 is described further with regard to FIGS. 2G, 211, 4, and 5.

"Intent suggestion" speech acts are utterances in which a user wishes to change the topic to discuss a different query intent, with regard to an entity that was mentioned in a previous user or agent utterance. An "intent suggestion" utterance is not a fully-defined query by itself, as the requested change in topic is with regard to entities previously discussed in the conversation history 202. Responsive to detecting an entity suggestion or an entity correction, the speech act classifier machine 110 may delegate handling of the user utterance 106 to an intent suggestion resolver machine 120 configured to rewrite the query in an unambiguous way that incorporates any relevant information from the conversation history 202, and in turn to delegate handling of the rewritten query to query answering machines 114.

"Ambiguity" speech acts are any ambiguous utterances that cannot be disambiguated based on the information in the user utterance 106 and/or the conversation history 202. For example, an ambiguous utterance may include a coreference that cannot be resolved to any entity from the conversation history 202, a coreference that corresponds to two different entities from the conversation history 202, or a suggestion to change a topic that is ambiguous with regard to suggested entity and/or intent. Responsive to detecting ambiguity, speech act classifier 110 is configured to delegate further processing of the user utterance 106 to a clarification skill 116 configured to output a clarifying question. A subsequent utterance received from the user may be classified as a "clarification" speech act. Responsive to detecting the clarification speech act, speech act classifier machine 110 is configured to delegate handling of the subsequent user utterance to a clarification resolution machine 122 configured to rewrite the original user utterance 106, so as to disambiguate the original user utterance 106 by incorporating relevant information from the clarification speech act. Accordingly, if the rewritten utterance is fully disambiguated, the rewritten utterance may be further handled by the query answering machines 114. If there are still ambiguities remaining after the clarification speech act, the rewritten utterance may be further processed by clarification skill machine 116 in order to output one or more additional clarifying question(s), before eventually delegating handling of a rewritten utterance to query answering machines 114.

The herein-described methods may enable downstream query answering machines to return answers to user utterances that include ambiguities, without requiring the downstream query answering machine(s) to handle disambiguation. The methods include providing an unambiguous, fully-formed rewritten utterance to the downstream query answering machine(s). The fully-formed rewritten utterance can be handled by the downstream query answering machine(s) in any suitable fashion. In some examples, a rewritten utterance is provided to a plurality of downstream query answering machines, which may all process the rewritten utterance (e.g., in parallel). Since the disambiguation is performed before sending the rewritten utterance, the rewritten utterance may be processed without performing any additional disambiguation steps, which may reduce a latency, memory requirement, and/or computational cost for the downstream query answering machines to return an answer.

In some examples, dataflow architecture 100 may be configured to provide multiple different possible rewritten queries to the one or more query answering machines, and to receive answers for each of the different possible rewritten queries. In some examples, the dataflow architecture 100 may be configured to provide multiple different answers in a single agent utterance. As an example, if a user asks "Who does Russell play for?" the methods of the present disclosure may deduce, based on the conversation history, that the user is referring to either "Russell Wilson" or "Russell Westbrook." Accordingly, two different rewritten queries, "Who does Russel Westbrook play for?" and "Who does Russell Wilson" play for may be issued to the one or more query answering machines. Based on results from the query answering machine(s), the dataflow architecture 100 may determine a similar confidence value for answers to these two different questions. Accordingly, the dataflow architecture 100 may be configured to output an utterance incorporating answers to both rewritten queries, such as "Russell Wilson plays for the Seahawks; but if you meant Russell Westbrook, he plays for the Thunder."

In some examples, user utterance 106 may be contextualized by a computer-accessible conversation history 202 representing a multi-turn dialogue between a user and an automated agent. Accordingly, computer-accessible conversation history 202 may include a plurality of utterances by the user and/or by the automated agent. In the illustrated example, user utterance 106 is the most recent user utterance, occurring after other user and/or automated agent utterances.

User utterance 106 may refer to one or more entities, for example, to define a query topic. In some examples, user utterance 106 may refer to the one or more entities using full names of the entities, which may be readily identified by downstream operators (for example, by searching in a knowledge base of entities based on the full name). However, in other examples, the entities may be referred to by way of coreferences. As used herein, "coreference" describes a portion of an utterance that refers to a specific entity. A single specific entity may be referred to by multiple different coreferences in a user utterance and/or in a series of user utterances.

Figure 1B:
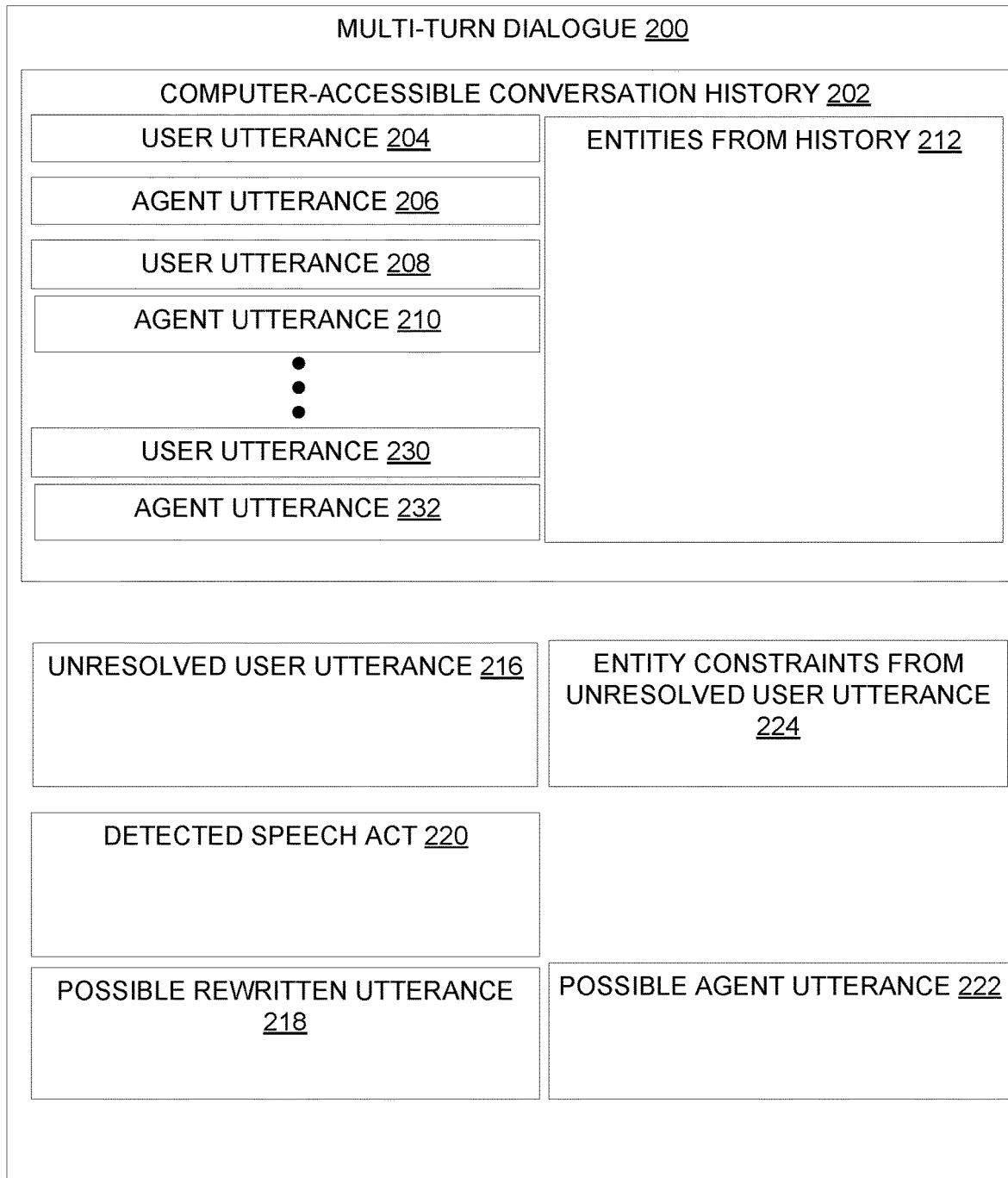
FIG. 1B shows an exemplary runtime state format for an architecture for processing user utterances.

FIG. 1B shows an exemplary runtime state format for a multi-turn dialogue 200. The runtime state format for multi-turn dialogue 200 may be processed in any suitable manner according to the methods and examples of the present disclosure. For example, the runtime state format for multi-turn dialogue 200 may be used to track a runtime state of dataflow architecture 100 of FIG. 1A. The runtime state format for multi-turn dialogue 200 includes an unresolved user utterance 216, which may be represented in any suitable form, e.g., as a computer-readable text string and/or as a computer-readable parse tree.

The runtime state format for multi-turn dialogue 200 further includes a computer-accessible conversation history 202. In some examples, computer-accessible conversation history 202 may be empty, including zero utterances. In other examples, computer-accessible conversation history 202 may include a single user utterance and/or a single agent utterance. More generally, computer-accessible conversation history 202 may include any suitable number of user utterances and/or agent utterances. For example, in FIG. 1B computer-accessible conversation history 202 is shown with user utterance 204, agent utterance 206, user utterance 208, agent utterance 210, user utterance 230, agent utterance 232, and other user/agent utterances not shown. User and/or agent utterances in the computer-accessible conversation history 202 may be in a temporal order, e.g., indicated by a timestamp or in any other manner. For example, the user and agent utterances in FIG. 1B may be arranged in a top-to-bottom order representing a temporal, first-to-last ordering of when the utterances occurred. Utterances in the computer-accessible conversation history 202 may be stored in any suitable format, for example as a collection data structure (e.g., list, array, or set data structure) including computer-readable text and/or parse trees for each utterance. Although FIG. 1B shows a computer-accessible conversation history 202 in which the recorded utterances are alternating between user utterances and agent utterances, utterances may occur in any other order, for example, multiple user utterances in a row without an agent utterance in response, multiple agent utterances in response to a single user utterance, or any other order.

Figure 2A:
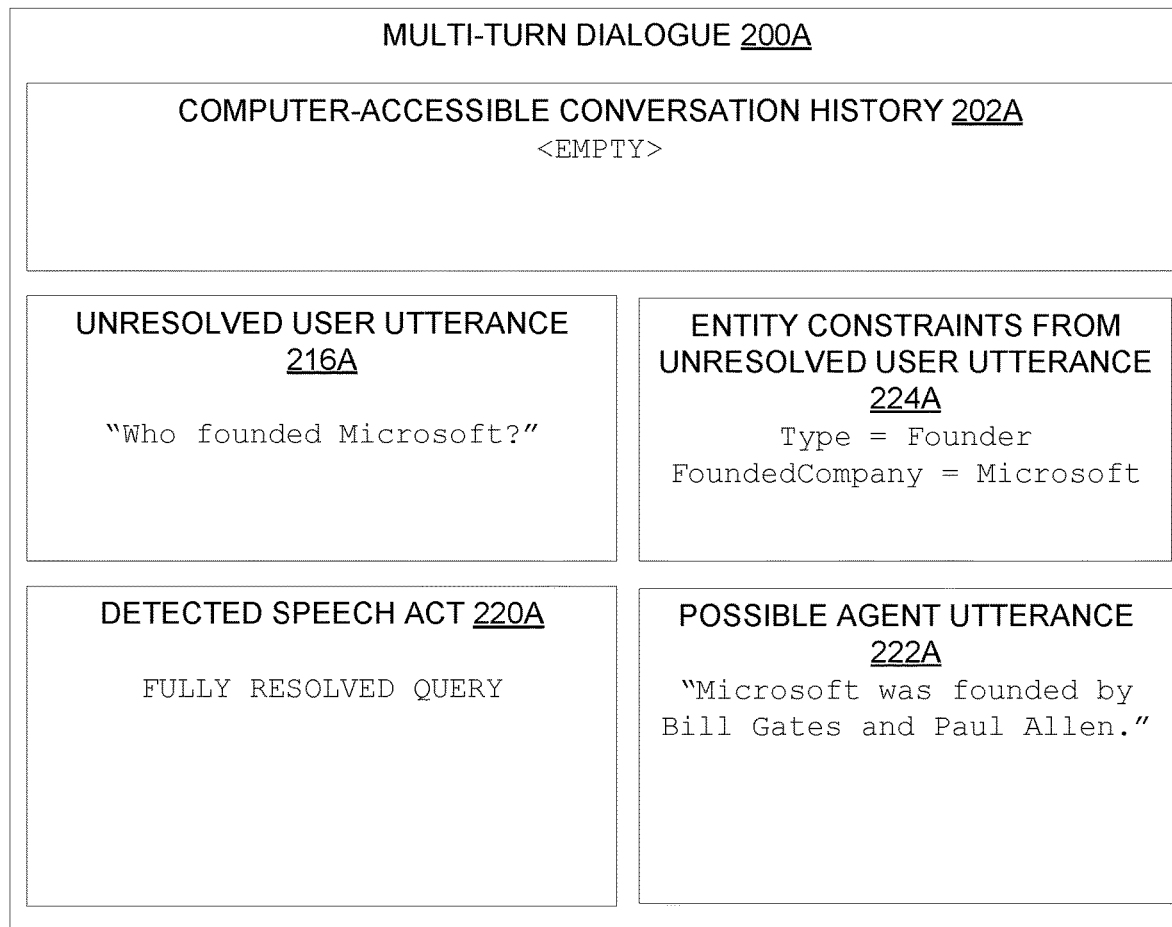
Figure 2B:
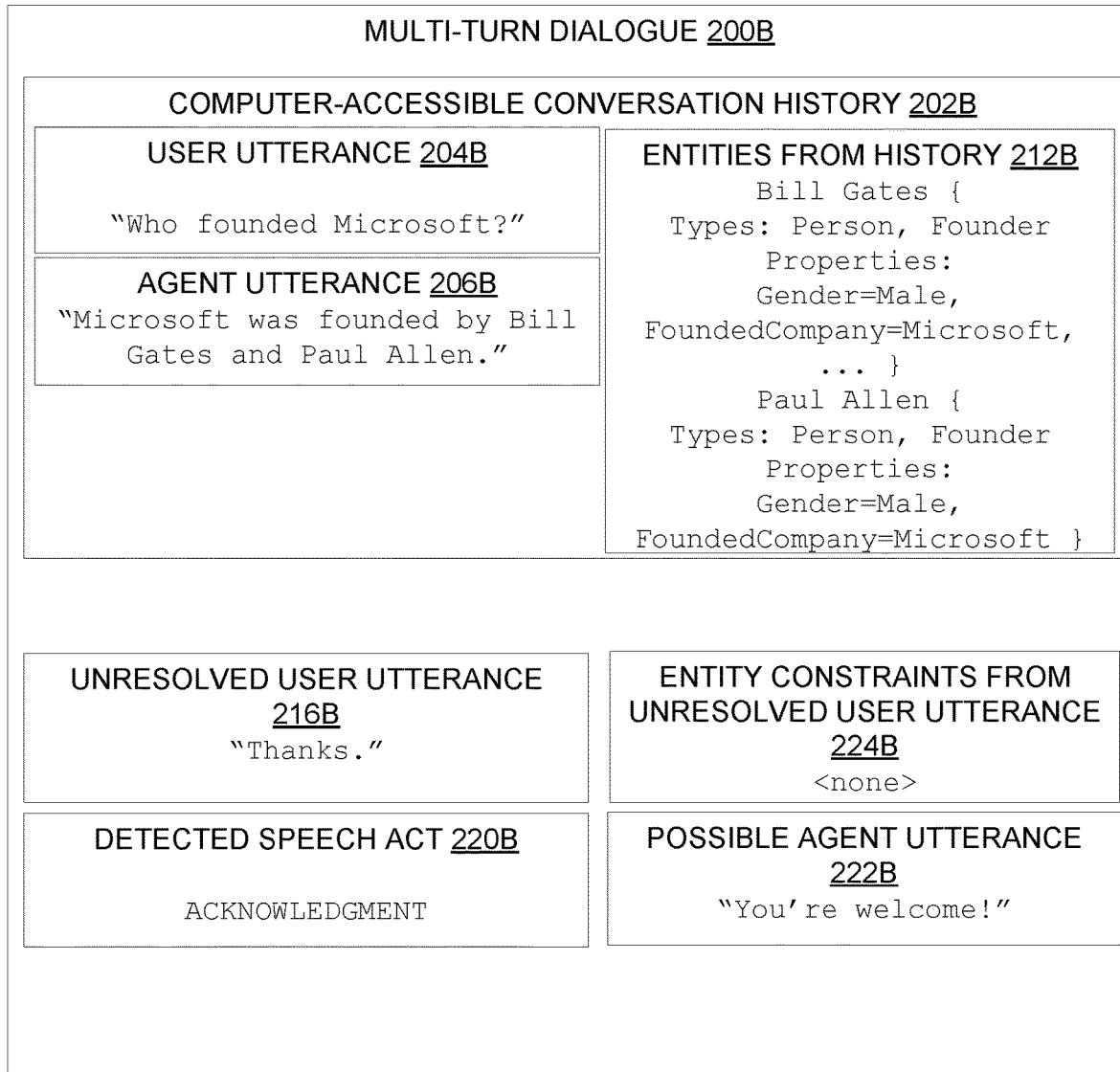
Figure 2C:
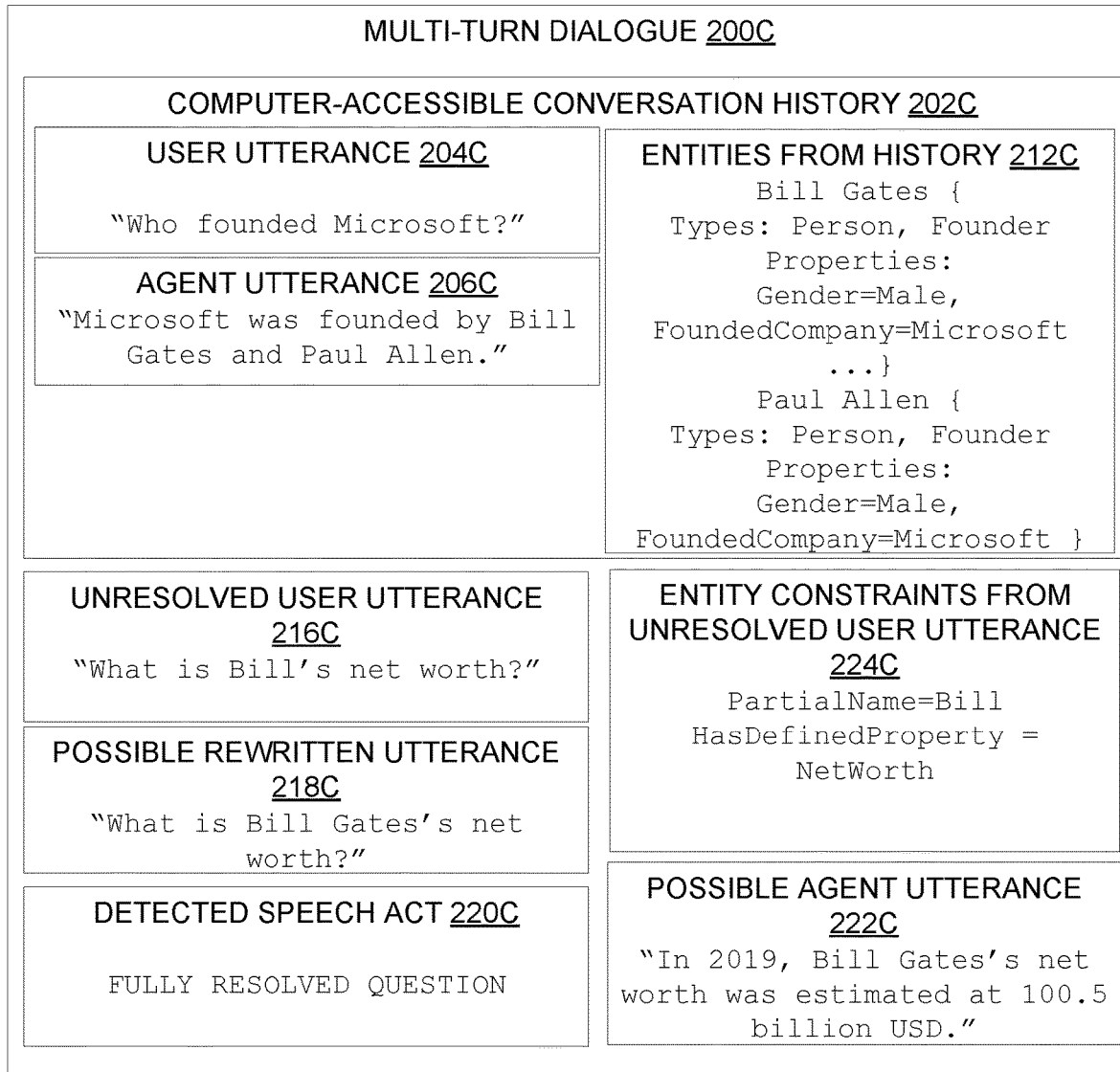

The computer-accessible conversation history 202 may further include a set of entities 212 from the history. The set of entities 212 may include any entities that are included in utterances in the history, e.g., entities explicitly named by the user, entities that occur in an answer by the agent, etc. Each entity includes any suitable details that may be relevant to the conversation. Non-limiting examples of entity details include entity name, a type of entity (e.g., person, place, etc.), a subtype of entity (e.g., a person entity may have a subtype such as "Founder," "Artist," etc.), relationships to other entities, and/or any other entity properties. In some examples, entity properties may be stored as key/attribute value pairs. Each entity in the set of entities may be stored in any suitable format, e.g., as a computer-readable syntax description in a data interchange language (e.g., JSON, XML), according to a database schema, etc. The set of entities 212 may be stored in any suitable format, e.g., as a database, collection data structure, graphical knowledge base, etc. For example, as shown in FIG. 2C, the set of entities 212 from the history includes Bill Gates and Paul Allen, organized by name and with properties/types for each entity.

The set of previously-resolved entities 212 from the history may be identified and/or tracked in any suitable manner by using the predefined language model and/or query answering machines. As a non-limiting example, the query answering machines may be configured to record each newly mentioned entity that can be unambiguously resolved from any user utterance and/or agent utterance. In some examples, tracking the set of previously-resolved entities may be at least partially implemented by a query answering machine. For example, the query answering machine may be configured to recognize entities from an utterance, and configured to output each entity that occurs in the utterance. The query answering machine may be further configured to track entities that occur in a response to the query, as a step included in determining the response to the query. However, the methods described herein are not so limited, and any method of tracking previously-resolved entities may be employed along with the methods and/or dataflow of the present disclosure. In some examples, the set of previously-resolved entities 212 from the history may include previously-resolved entities from a possible rewritten utterance 218 and/or from a possible agent utterance 222. These previously-resolved entities may be tracked in any suitable manner, for example, by sending the possible rewritten utterance 218 to a query answering machine and/or by receiving possible agent utterance 222 from a query answering machine along with previously-resolved entities 212 determined by the query answering machine to pertain to the possible agent utterance 222. Although shown as part of computer-accessible conversation history 202, the entities 212 from the history may be tracked separately and stored on any computing device. As another non-limiting example, the entities 212 from the history may be tracked by query answering machines and stored on the query answering machines, and the query answering machines may be consulted to retrieve entity data from the query answering machines and/or to retrieve specific results pertaining to the entities (e.g., looking up an entity property by entity name).

The runtime state format for multi-turn dialogue 200 further includes other runtime state information related to processing the unresolved user utterance 216, including entity constraints 224 from the unresolved user utterance. The entity constraints may include entity properties, names, and/or types, which may be automatically deduced from the unresolved user utterance 216 by using a predefined language model according to the present disclosure. The runtime state format for multi-turn dialogue 200 further includes a detected speech act 220, which may be automatically deduced from the unresolved user utterance 216 by a speech act classifier machine according to the present disclosure. The detected speech act may be one of a predefined plurality of predefined speech acts, and may be represented in any suitable format, for example, as a computer-readable integer index or a computer-readable text string. In some examples, the methods of the present disclosure include rewriting the unresolved user utterance 216 to produce a possible rewritten utterance 218. The possible rewritten utterance 218 is a complete, fully-defined utterance that can be processed without re-analyzing the information in the computer-accessible conversation history 202. In some examples, the methods of the present disclosure include determining a possible agent utterance 222 to be output by an automated agent. The possible rewritten utterance 218 and the possible agent utterance 222 each may be stored in any suitable form, for example, as a computer-readable text string, or as a computer-readable parse tree. The computer-accessible conversation history 202 may be stored in any suitable location, for example locally on a computing device that provides an automated agent, or remotely in a cloud computing server.

Various multi-turn dialogues will be described with regards to FIGS. 2A-2M. In FIGS. 2A-2M, multi-turn dialogues 200 are shown according to the runtime state format for multi-turn dialogues 200 shown in FIG. 1B. Each of the FIGS. 2A-2M is with regard to a different multi-turn dialogue; however, like components are labelled using a numeric prefix corresponding to a component of the runtime state format for multi-turn dialogues 200 from FIG. 1B, and an alphabetic suffix corresponding to the figure. For example, FIG. 2A shows a multi-turn dialogue 200A, whereas FIG. 2B shows a multi-turn dialogue 200B. Components may be referred to without the alphabetic suffix when referring generically to a like component of multiple different multi-turn dialogues. In FIGS. 2A-2M, the relevant aspects of the runtime state format for multi-turn dialogues 200 are shown to explain the example use scenarios, while aspects that are not relevant to the example use scenarios are not shown.

In some examples, as shown in FIG. 2A, the only reference to an entity in unresolved user utterance 216A is a full name ("Microsoft"), and accordingly coreference resolution machine 102 detects that the unresolved user utterance actually contains a fully resolved query. As such, the user utterance can be processed by speech act classifier machine 110 to detect that the speech act 220A is a fully resolved query. Accordingly, the fully resolved query can be forwarded to one or more query answering machines 114 in order to obtain an answer, which could be output by the agent as a possible agent utterance 222A. The computer-accessible conversation history 202A also indicates any relevant entity constraints 224A from the unresolved user utterance, indicating that the user is interested in an entity who has a "Founder" type and founded the Microsoft company.

In some examples, as shown in FIG. 2B, an unresolved user utterance 216B is a simple "thanks" which does not actually include any references to entities. Accordingly, coreference resolution machine 102 detects that the unresolved user utterance 216B can be sent straight to the speech act classifier machine 110, which in turn detects an acknowledgment speech act. Simple speech acts such as acknowledgments, greetings, or statements of confirmation/rejection can be handled by greeting/acknowledgment/rejection response machine 112 which is configured to provide responses to these simple speech acts. In addition to politely handling user utterances such as "thanks" or "hello," the greeting/acknowledgment/rejection response machine 112 can issue similarly polite responses to other user utterances such as affirming a proposed course of action, rejecting a proposed course of action, etc.

Although the unresolved user utterance 216B in FIG. 2B does not mention any entities, the computer-accessible conversation history 202B may still track entities 212B from the history, e.g., Bill Gates and Paul Allen who were mentioned in agent utterance 206B responsive to user utterance 204B. Relevant properties for the entities 212B from the history are tracked along with entity names, for example, tracking entity type(s), entity properties, etc. Although "Bill Gates" is shown with tracked "Person" and "Founder" types and tracked "gender" and "founded company" properties, entities may have other associated types and/or properties that are associated with features of the entity determined from knowledge bases, web search, query answering machines, etc. For example, for "Bill Gates" other types and/or properties could be tracked, such as a "Inventor" type or a "FoundedCompany=Bill and Melinda Gates Foundation" property.

In other examples, as shown in FIG. 2C, one or more coreferences within an unresolved user utterance 216C are ambiguous and/or require context from the computer-accessible conversation history 202. As shown in FIG. 2C, the methods of the present disclosure (namely, method 300 which will be discussed below with regard to FIG. 3) may be used to deduce that the partial name "Bill" refers to the entity "Bill Gates" tracked in the entities 212C from the history 202C. The unresolved user utterance 216C does not sufficiently disambiguate "Bill Gates" by itself, (even though the entities 212C include "Bill Gates"), because "Bill Gates," is referred to only by first name "Bill" in the unresolved user utterance 216. As such, although an automated assistant system may be able to process the unresolved user utterance 216C in the context of the computer-accessible conversation history 202C, the unresolved user utterance 216C would not be suitable for processing by downstream query answering machines which may not be configured to access the computer-accessible conversation history 202C. Note that "Bill Gates" as tracked in entities 212G from the history is shown with only a selection of possibly relevant types and/or properties shown, for example, Bill Gates could additionally have a "NetWorth" property defined to track his net worth in U.S. dollars.

Accordingly, coreference resolution machine 102 is configured to pre-process the user utterance 106 to resolve any potentially ambiguous coreferences in the user utterance, to produce a rewritten utterance. The rewritten utterance is self-contained for detection of speech acts by speech act classifier machine 110, and/or further processing by downstream query answering machines and the like. For example, in FIG. 2C, after rewriting, the detected speech act 220F is a fully resolved question.

Examples of coreferences include partial names (e.g., as with "Bill" shown in FIG. 2C), full names, and other names such as nicknames, titles, etc. In some examples, coreferences may also include misspelled/mispronounced names, etc. Accordingly, user utterances may refer to the same person in multiple different ways, with each such reference being a coreference to the same entity. As a specific example, a user utterance may refer to "Bill Gates" variously as any of the following: 1) "William Henry Gates III," 2) "Bill Gates," 3) "Bill," 4) "Mr. Gates," or 5) "Gates," among other possibilities. Coreferences also include pronouns, for example, Bill Gates could be referred to as "he" or "him," and other nouns that are related to Bill Gates could be described using the possessive pronoun, "his" to refer to Bill Gates, e.g., "his wife," could refer to "Bill Gates's wife." Coreferences may also include an explicit reference to an entity from a listing of entities from the computer-accessible conversation history 202, e.g., "the first one," "the second one," "number three," or any other suitable description to refer to an entity that was provided by the user and/or by the agent in an ordered listing of entities within an utterance from a computer-accessible conversation history 202.

Figure 2D:
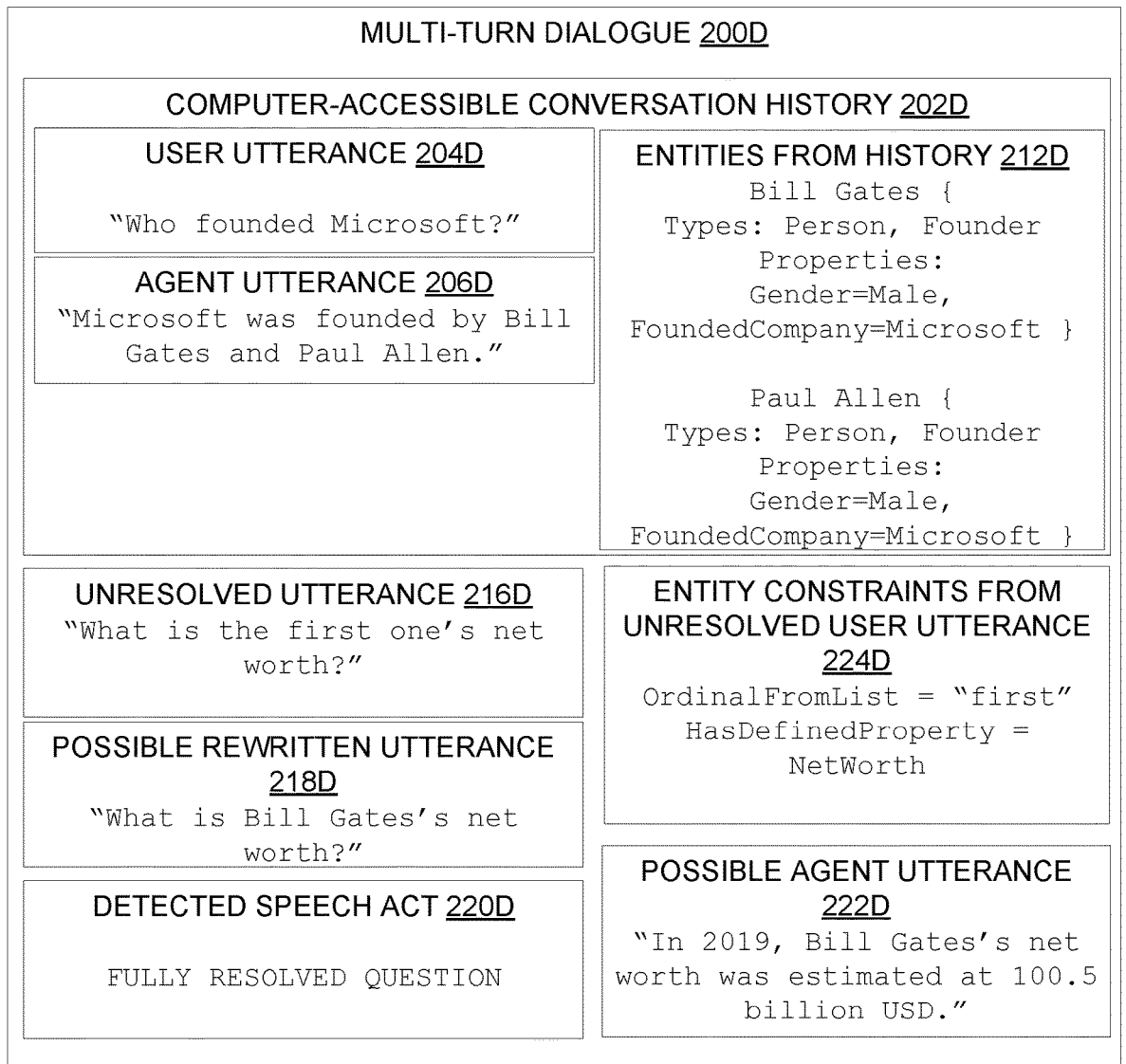
Figure 2E:
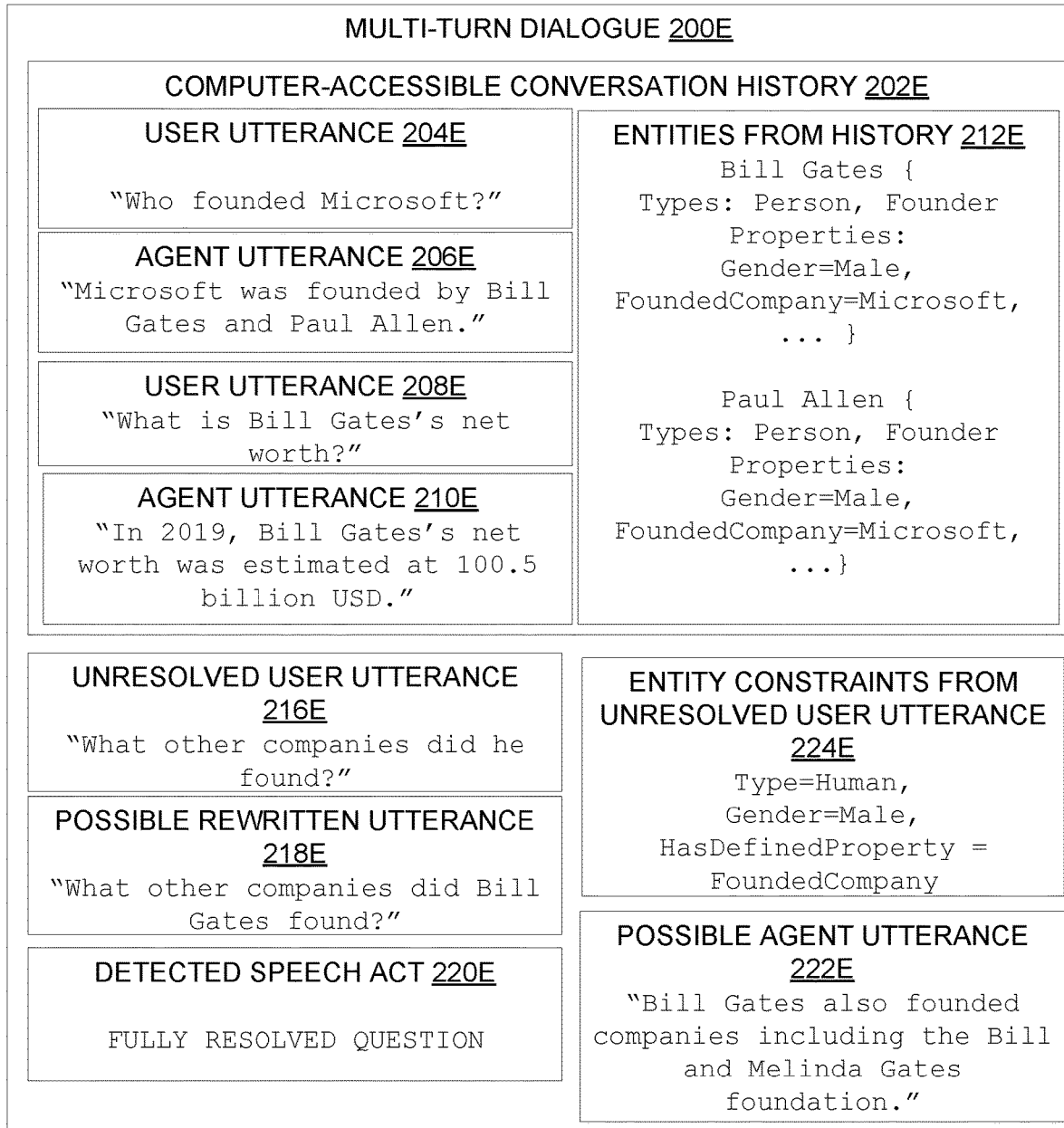

FIGS. 2D and 2E show further examples of multi-turn dialogues in which an ambiguous entity from an unresolved user utterance 216 is resolved to refer to "Bill Gates." FIG. 2D features a coreference to "Bill Gates" in the form of a reference to "the first one" from the ordered listing of "Bill Gates and Paul Allen" in agent utterance 206D. FIG. 2E features a coreference to "Bill Gates" in the form of a pronoun, "he."

Figure 3:
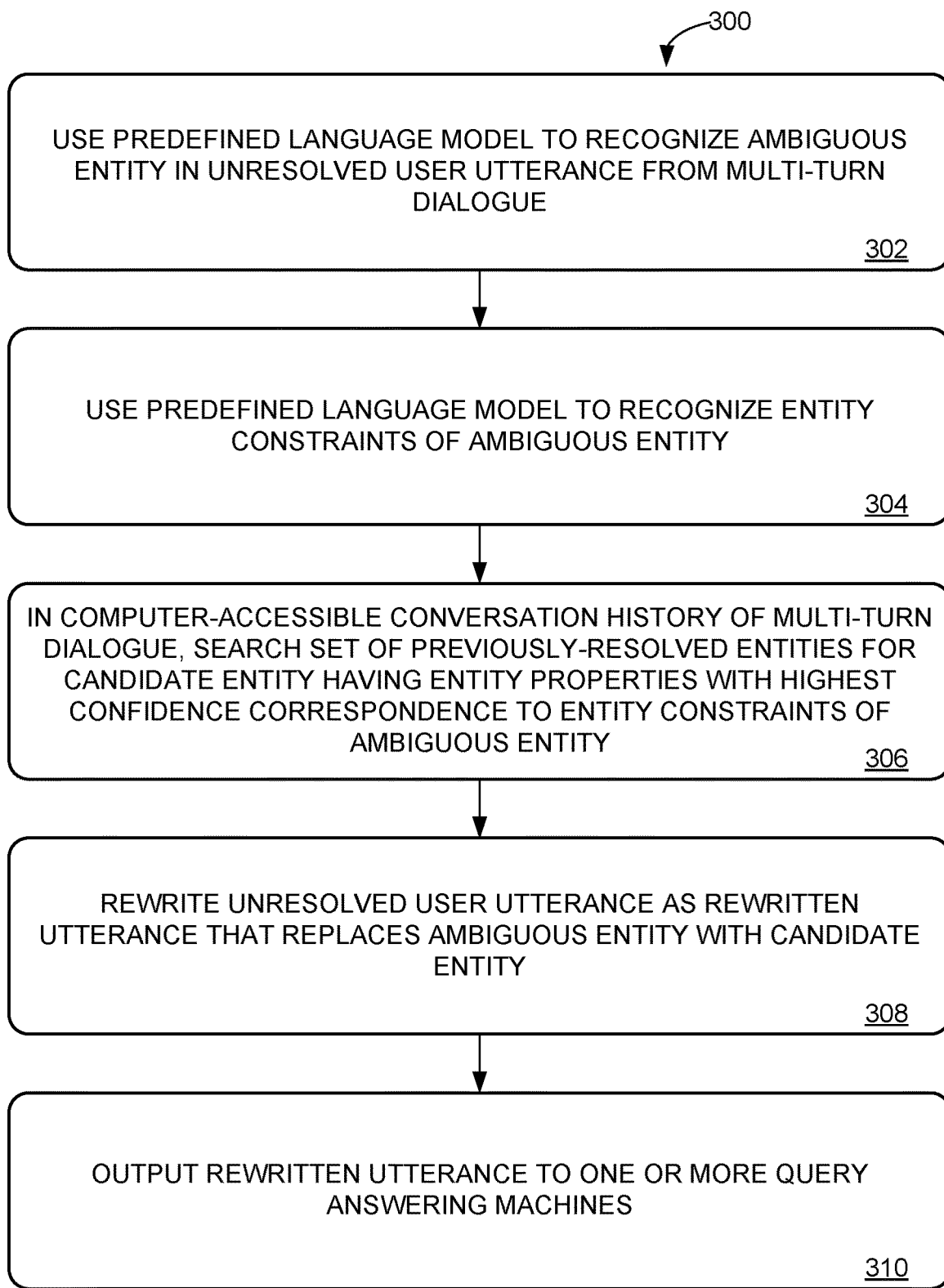
FIG. 3 shows a method for resolving an ambiguous entity in a user utterance.

Accordingly, FIG. 3 shows a method 300 for disambiguating user queries in a multi-turn dialogue including a set of user utterances by resolving coreferences. Coreference machine 102 may be configured to implement method 300.

At 302, method 300 includes using a predefined language model (e.g., any suitable predefined language model as described above) to recognize an ambiguous entity in an unresolved user utterance from a multi-turn dialogue. The ambiguous entity may be any natural language reference to an entity (e.g., a coreference to the entity as described above). For example, in FIG. 2C, "Bill" is an ambiguous entity. In FIG. 2D, "the first one," is an ambiguous entity. In FIG. 2E, "his" is a possessive pronoun reference to an ambiguous entity.

At 304, method 300 further includes using the predefined language model to recognize entity constraints of the ambiguous entity. The entity constraints may be derived from any words of the user utterance, e.g., a coreference phrase referring to the entity, a verb describing an action performed by the entity, an adjective describing an entity property, etc.

For example, in FIG. 2C, the entity constraints include the partial first name "Bill," and the relevance of the "NetWorth" property. In FIG. 2D, the entity constraints 224D include the relevance of the "NetWorth" property as well as an indication that the user is interested in "the first" entry from a list of entries, e.g., "Bill Gates" from the listing of "Bill Gates and Paul Allen" in the agent utterance 206D. In FIG. 2E, the entity constraints 224E include "Gender=Male" (e.g., based on the male pronoun "he" from the unresolved user utterance 216E) and "HasDefineciProperty=FoundedCompany" based on the verb phrase "companies did he found" in the unresolved user utterance 216E.

At 306, method 300 further includes, in a computer-accessible conversation history of the multi-turn dialogue, searching a set of previously-resolved entities for a candidate entity having entity properties with a highest confidence correspondence to the entity constraints of the ambiguous entity.

Confidence of correspondence between entity constraints and entity properties may be determined in any suitable fashion, e.g., by measuring a number or proportion of entity constraints/properties that match. In some examples, confidence derived for a constraint/property match may be weighted differently for different constraints/properties, e.g., matching a partial name may be weighted more highly than matching a pronoun gender, or vice versa. In some examples, confidence values may be assessed by the predefined language model, and/or by one or more other machine learning, artificial intelligence, and/or statistical models. More generally, determining the confidence of correspondence may be based on correspondence between the entity constraints with any suitable features of the computer-accessible conversation history 202 and/or entities 212 from the history. For example, the entity constraints may correspond to entity types and/or entity properties and the confidence may be based on a number and/or proportion of corresponding entity properties/types. The confidence may be additionally determined by context provided by the computer-accessible conversation history 202 such as whether an entity appeared in an ordered listing of entities, and/or how recently one of the entities 212 from the history was mentioned in a user utterance or agent utterance from the computer-accessible conversation history 202.

In some examples, searching the set of previously resolved entities for the candidate entity includes resolving an entity type based on the entity constraints of the ambiguous entity, and accordingly searching the set of previously resolved entities for the candidate entity includes finding a subset of previously resolved entities having a corresponding entity type. The corresponding entity type may be a same type or a related type from a hierarchy of types. For example, the hierarchy of types may include a "Person" type and a "Founder" type that is a sub-type of the "Person" type. Accordingly, for the example shown in FIG. 2E, when searching based on the "Person" type, the subset of previously resolved entities could have the "Person" type, the "Founder" type, or any other suitable sub-type of the "Person" type (e.g., "Actor" or "Musician"). Although the example in FIG. 2E shows only "Bill Gates" and "Paul Allen" among the tracked entities from history 202, entities 212 from the history could include other entities such as the "Microsoft" corporation entity. Nevertheless, searching for an entity to resolve the "he" coreference from unresolved user utterance 216E may include searching for a subset of entities that match the "human" type so that the search is effectively restricted to only consider relevant entities such as Bill Gates and Paul Allen, and not to consider entities with non-matching types such as "Microsoft."

In some examples, the candidate entity is resolved from a user utterance from the computer-accessible conversation history, which could be an original user utterance or a rewritten user utterance. For example, in FIG. 2E, "he" from unresolved user utterance 216E can be resolved to "Bill Gates" which is mentioned in (rewritten) user utterance 218E from the computer-accessible conversation history 202E. In some examples, the candidate entity is resolved from one of the automated assistant utterances of the multi-turn dialogue, for example, in FIG. 2D, "the first one" from unresolved user utterance 216D is resolved to "Bill Gates" from agent utterance 206D.

In some examples, as in FIG. 2C, the entity constraints of the ambiguous entity include a partial name of the ambiguous entity, and accordingly, searching the set of previously-resolved entities for the candidate entity includes finding a subset of previously-resolved entities having a full name consistent with the partial name, wherein the candidate disambiguating entity is from the subset. For example, in FIG. 2C, determining a higher-confidence correspondence for "Bill Gates" may be based on correspondence between the entity name "Bill Gates" and the "PartialName=Bill" constraint and correspondence between the "HasDefinedProperty=NetWorth" constraint and a "NetWorth" property of Bill Gates (e.g., among other properties of Bill Gates not shown in entities 212C from the history).

In some examples, such as FIG. 2D, the ambiguous entity in the unresolved user utterance includes an ordinal number reference to an ordered list of entities from the multi-turn dialogue, and wherein the candidate entity is a corresponding entry from the ordered list of entities. In FIG. 2D, in addition to having a defined "NetWorth" property, the entity of interest from unresolved utterance 216D is "the first one," which corresponds with high confidence to the first entity, "Bill Gates" from the ordered listing of "Bill Gates and Paul Allen."

In some examples, as in FIG. 2E, the ambiguous entity in the unresolved user utterance includes a pronoun, the entity constraints of the ambiguous entity include a pronoun gender, and wherein searching the set of previously-resolved entities for the candidate entity includes finding a subset of previously-resolved entities having a gender consistent with the pronoun gender. In some examples, in addition to considering pronoun gender, searching the set of previously-resolved entities may be based on other pronoun features such as plurality, animacy (e.g., pronouns for referring to humans such as 'he' or 'she' vs. pronouns for referring to objects such as 'it' or places such as 'there'). In FIG. 2E, the entity constraints from the unresolved user utterance 216E include "Gender=Male" and "HasDefineclProperty=FoundedCompany." These constraints match both Bill Gates and Paul Allen (e.g., both are male, both have the "Founder" type and the "FoundedCompany" property). However, "Bill Gates" was more recently mentioned in user utterance 210E. Accordingly, coreference resolution machine 102 may be configured to assess a relatively higher confidence that the user is more likely asking a follow-up question about "Bill Gates" than a question about "Paul Allen." Accordingly, "Bill Gates" has the highest confidence correspondence to the entity constraints of the ambiguous entity ("he") from unresolved user utterance 216E.

In some examples, method 300 further includes using the predefined language model to recognize a verb predicate derived from the unresolved user utterance, wherein the entity constraints of the ambiguous entity include the verb predicate, and wherein searching the set of previously-resolved entities for the candidate entity includes finding a subset of previously-resolved entities having a defined value for the verb predicate. For example, unresolved user utterance 216E of FIG. 2E includes a verb predicate indicating that the entity of interest "founded" one or more companies. Accordingly, searching the set of previously-resolved entities may include finding a subset of previously-resolved entities having a relevant property such as the "Founded-Company" property.

Figure 2F:

In some examples, as shown in FIG. 2F, the entity constraints of the ambiguous entity may include a dependency relationship between the ambiguous entity and a base entity, and accordingly searching for the candidate entity includes searching for the base entity, and automatically resolving the candidate entity using the dependency relationship between the ambiguous entity and the base entity. For example, unresolved user utterance 216F of FIG. 2F includes two distinct entities, "Bill" and "his wife." However, the dependent entity "his wife," can be readily resolved by a downstream query answering machine if the coreference "Bill" is first resolved, e.g., by looking up "Bill" in a knowledge base and finding related entities. Accordingly, the query can be resolved to rewritten utterance 218F by replacing "Bill" with "Bill Gates," and the entity "his wife" does not need to be rewritten.

At 308, method 300 further includes rewriting the unresolved user utterance as a rewritten utterance that replaces the ambiguous entity with the candidate entity. For example, FIGS. 2C-2F show rewritten user utterances 218 corresponding to the unresolved user utterances 216, with ambiguous entities replaced by selected candidate entities from the computer-accessible conversation history.

In many cases, as shown in FIGS. 2C-2F, the rewritten utterance can be fully resolved so that coreferences to entities are replaced with explicit references to the entities. Since the rewritten utterance is fully resolved, with any entities mentioned in an unambiguous way, the rewritten utterance can be processed by the one or more query answering machines without needing to access context from the computer-accessible conversation history. Accordingly, at 310, method 300 includes outputting the rewritten utterance to one or more query answering machines.

However, in many examples, even after processing coreferences (e.g., by coreference resolution machine 102 of FIG. 1, and/or according to method 300 of FIG. 3), the resulting rewritten query may not be a fully-resolved query that can be processed by query answering machines 114.

In some examples, even after all coreferences are resolved, the rewritten utterance may still require context from the computer-accessible conversation history 202 for query answering. Accordingly, in addition to sending fully-defined queries to query answering machines, different speech acts may be processed in a specialized fashion depending on the speech act. For example, an utterance may be an entity suggestion speech act or an entity correction speech act, intended to change the conversation topic to discuss a previously-established intent with regard to a different entity, and accordingly the utterance may be processed by an entity suggestion/correction resolver machine 118 of FIG. 1, which will be described further below with regard to FIGS. 2G-2H and 4. Similarly, an utterance may be an intent suggestion speech act, intended to change the conversation topic to discuss a different intent with regard to a previously-established entity, and accordingly the utterance may be processed by an intent suggestion resolver machine 120 of FIG. 1, which will be described further below with regard to FIGS. 2I and 5.

Figure 2G:
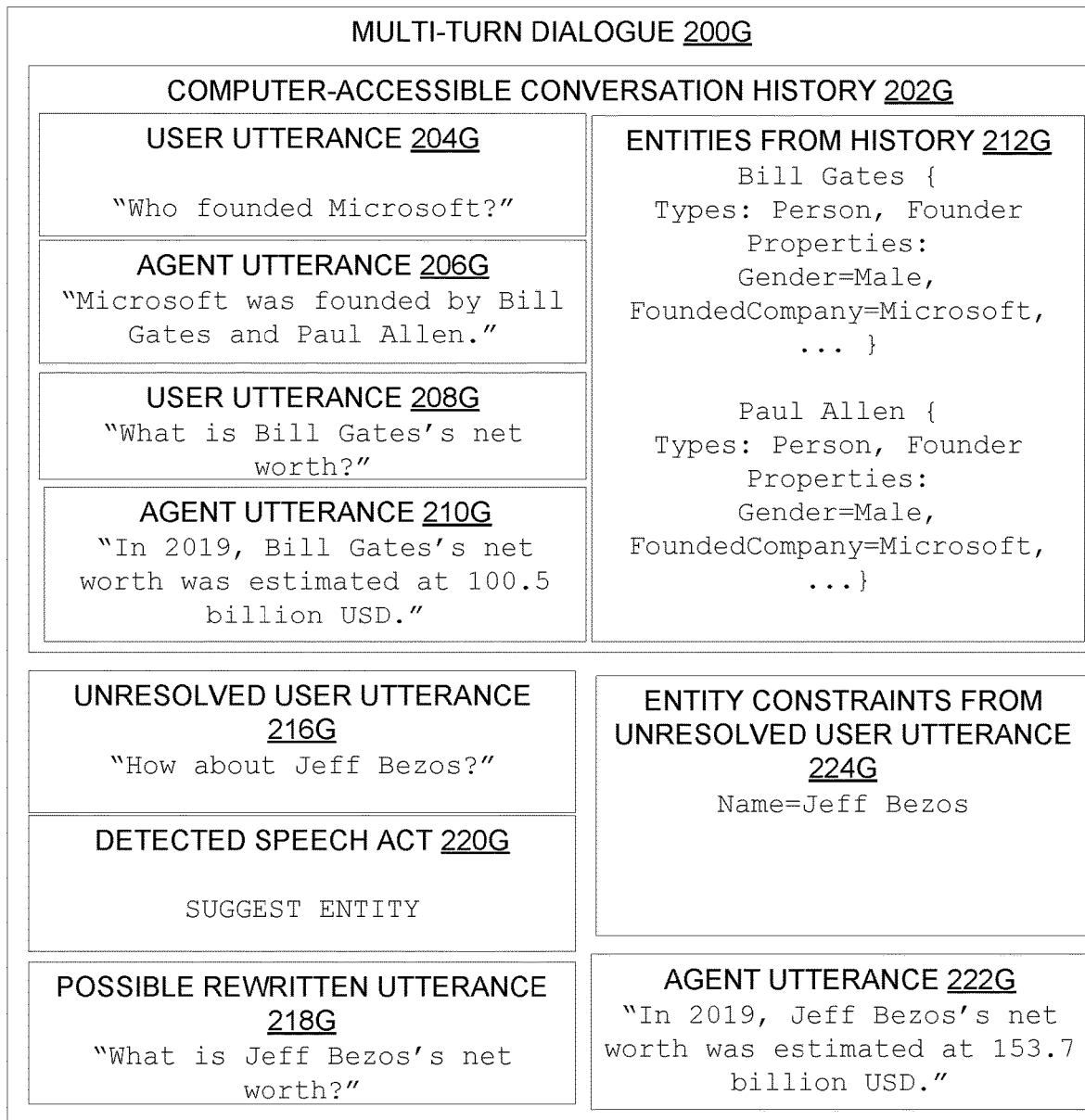

FIG. 2G shows an example of an entity suggestion speech act in an unresolved user utterance 216G that has already been pre-processed by coreference resolution machine 102 and classified as a "suggest entity" speech act by speech act classifier machine 110. In an entity suggestion speech act, the computer-accessible conversation history 202G already includes discussion of another entity, with regard to a defined query intent. For example, the discussion could be about a property of interest of the other entity. In FIG. 2G, the computer-accessible conversation history 202G includes previous discussion of Bill Gates's net worth, e.g., the conversation is related to a query intent defined by the "net worth" entity property with regard to entity "Bill Gates." Accordingly, unresolved user utterance 216G establishes a change of topic to discuss the same query intent (e.g., defined by the "net worth" entity property) with regard to a new entity, "Jeff Bezos." Entity suggestions may include any suitable indication of the change of topic, for example, natural language phrases such as "how about" or "what about" or "regarding" may indicate the entity suggestion speech act and accordingly, such natural language phrases may be detected by the speech act classifier machine 110, e.g., using a predefined language model as described above. If the entity suggestion speech act is detected, then the remainder of the user utterance may be assessed to define a new entity the user intends to discuss, namely "Jeff Bezos." Then, based on the user's intent to discuss Jeff Bezos, the original user utterance 208G may be rewritten to incorporate the entity suggestion, e.g., by replacing "Bill Gates" with "Jeff Bezos" in the rewritten user utterance. Accordingly, after detecting the "suggest entity" speech act 220G, the unresolved user utterance 216G can be rewritten, for example as possible rewritten utterance 218G, to result in a fully-formed query.

Figure 2H:
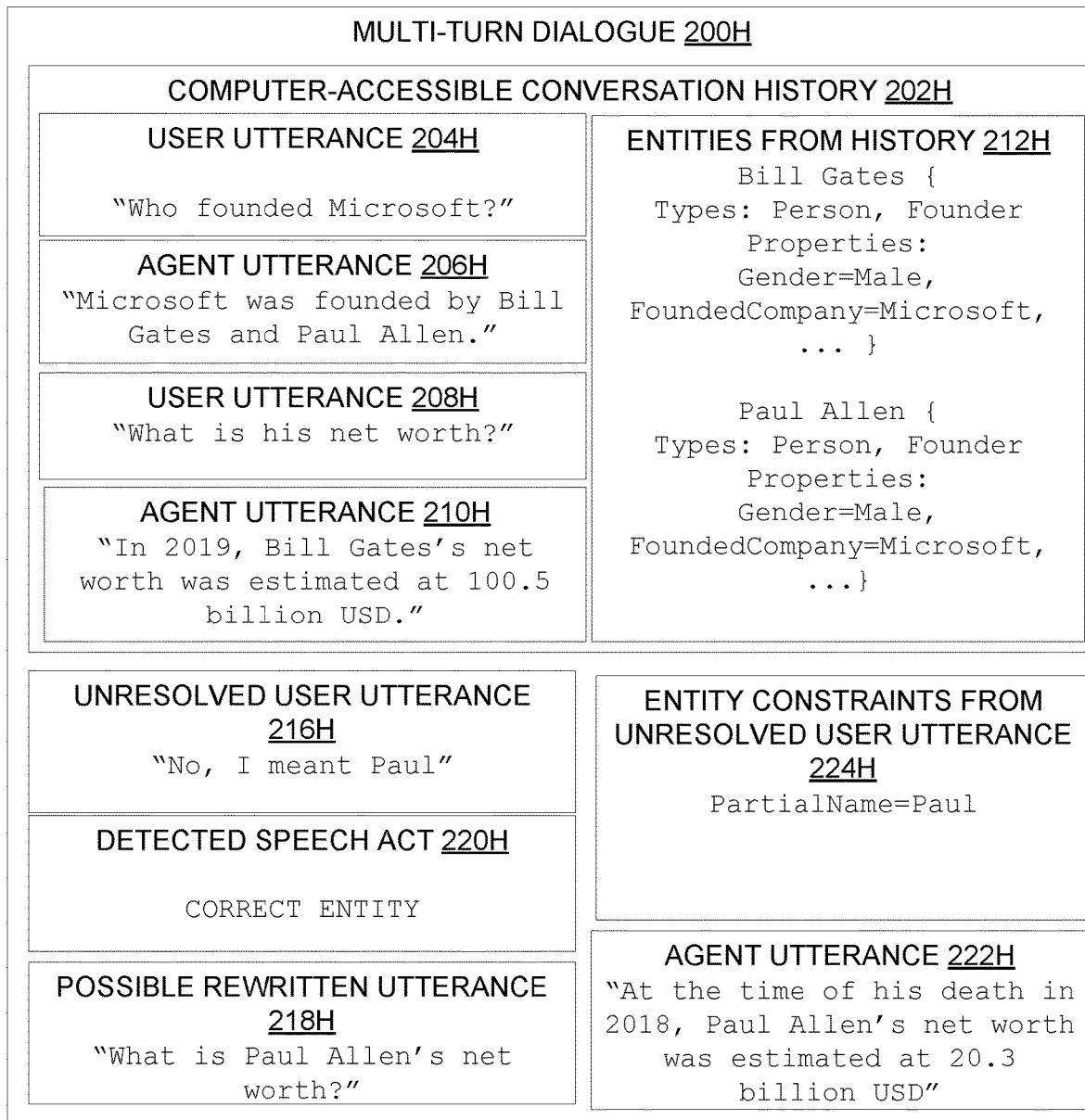
Figure 21:
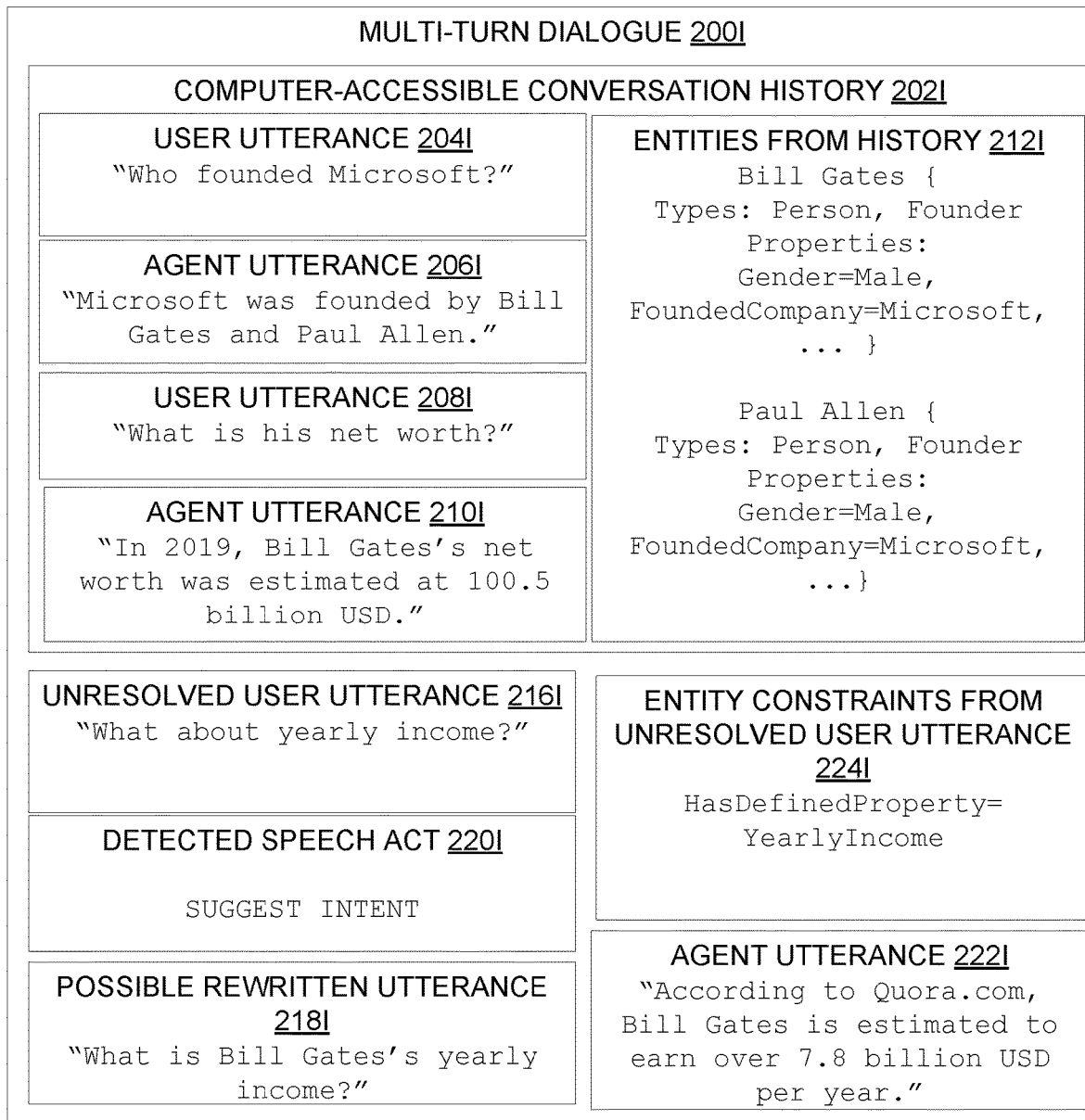

FIG. 2H shows an example of an entity correction speech act in an unresolved user utterance 216H that has already been pre-processed by coreference resolution machine 102 and classified as a "correct entity" speech act by speech act classifier machine 110. Although the entities 212H from the history include both Bill Gates and Paul Allen, in the depicted example, user utterance 208H, which mentions "his net worth," was resolved to refer to Bill Gates. For example, coreference machine 102 may assess a higher confidence for Bill Gates and the "net worth" property, because Bill Gates is a living entity who has a current "net worth" property, whereas Paul Allen is deceased and the "net worth" property may be less relevant. Accordingly, agent utterance 210H pertains to Bill Gates. However, the user may in fact have been interested in Paul Allen's net worth, for example at the time of his death. Accordingly, the user may say "No, I meant Paul" which is detected as a "correct entity" speech act to change the topic to discuss Paul Allen instead. Coreference resolution machine 102 may be used to pre-process the unresolved user utterance to determine that "Paul" does indeed refer to Paul Allen. Similar to entity suggestion, entity correction speech acts may be detected in any suitable fashion by speech act classifier machine 110, e.g., by detecting indicator words such as "I mean" or "no." If the "correct entity" speech act is detected, then the remainder of the user utterance may be assessed to define an entity the user intends to discuss, namely "Paul Allen." Then, based on detecting the "correct entity" speech act 220H and detecting the user's intent to discuss Paul Allen, the original user utterance 208H may be rewritten to incorporate the entity suggestion, e.g., by replacing "Bill Gates" with "Paul Allen" in the rewritten user utterance. Although resolving entity suggestions/corrections in FIGS. 2G and 2H is based on looking up an entity based on a partial or full name constraint, the coreference resolution techniques described above with regard to FIGS. 2C-2F and method 300 may be similarly applied to search for relevant entities in resolving entity suggestions/corrections.

Figure 4:
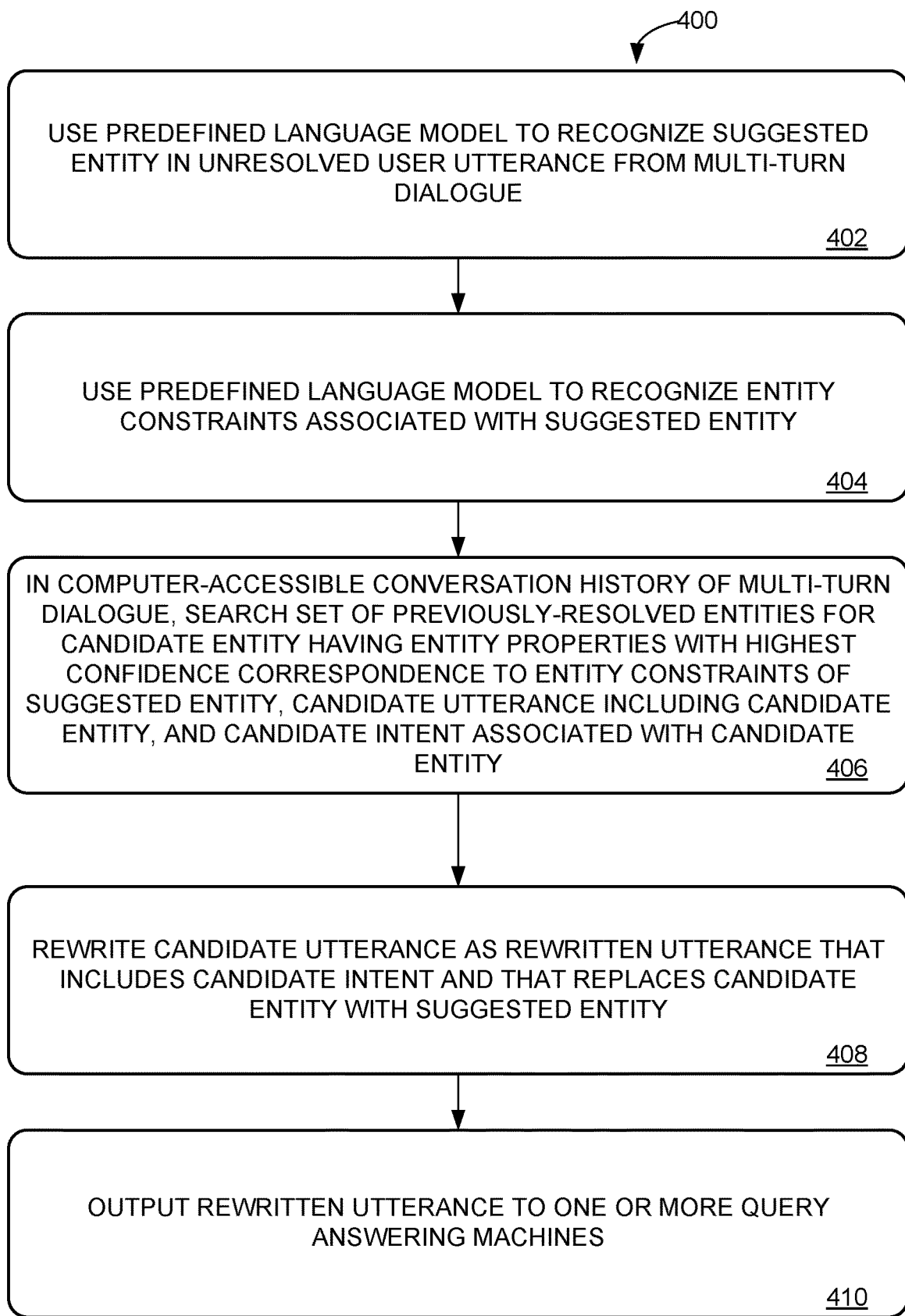
FIG. 4 shows a method for resolving a suggested or corrected entity in a user utterance.

Accordingly, FIG. 4 shows a method 400 for disambiguating user queries in a multi-turn dialogue including a set of user utterances, by resolving entity suggestions and/or corrections, e.g., in an entity suggestion/correction resolver machine 118 as shown in FIG. 1. Method 400 is described with regard to a suggested entity, but the techniques described herein apply similarly to resolving a corrected entity. Entity suggestion/correction machine 118 may be configured to implement method 400.

At 402, method 400 includes using a predefined language model (e.g., any suitable predefined language model as described above) to recognize a suggested entity in an unresolved user utterance from the multi-turn dialogue. The suggested entity may be referred to in any suitable fashion, e.g., via coreference. Detecting that an entity is being suggested may be based on any suitable features, for example based on detecting a related English phrase such as "how about," detecting a relevant phrase in any other language, or in any other suitable manner.

At 404, method 400 includes using the predefined language model to recognize entity constraints associated with the suggested entity. The entity constraints may be derived from any words of the user utterance in any suitable manner, e.g., a full or partial name, a coreference phrase referring to the entity, a verb describing an action performed by the entity, an adjective describing an entity property, etc. For example, in FIG. 2G, the suggested entity "Jeff Bezos" is referred to by full name. Alternately, "Jeff Bezos" could be referred to in any other manner, e.g., "the founder of Amazon," or "Bezos." The suggested entity may be resolved in any suitable manner, e.g., using coreference resolution methods described herein.

At 406, method 400 includes, in a computer-accessible conversation history of the multi-turn dialogue, searching a set of previously-resolved entities for a candidate entity having entity properties with a highest confidence correspondence to the entity constraints of the suggested entity, a candidate utterance including the candidate entity, and a candidate intent associated with the candidate entity. The candidate utterance may be any utterance that mentions the candidate entity, e.g., a user utterance or an agent utterance. Similarly to resolving coreferences, the entity constraints of the suggested entity may include a partial name of the suggested entity, and accordingly searching the set of previously-resolved entities for the candidate entity includes finding a subset of previously-resolved entities having a full name consistent with the partial name, wherein the candidate entity is among the subset. In other examples, the ambiguous entity in the unresolved user utterance may include an ordinal number reference to an ordered list of entities from the multi-turn dialogue, and accordingly the candidate entity can be identified as a corresponding entry from the ordered list of entities. In some examples, the entity constraints of the suggested entity include a dependency relationship between the suggested entity and a base entity, and accordingly searching for the candidate entity includes searching for the base entity, and automatically resolving the candidate entity using the dependency relationship between the suggested entity and the base entity. For example, a user utterance including an entity suggestion could be of any of the following forms: "what about her?" "what about the third one?" "what about his wife?".

The candidate intent may be an intent from the candidate utterance, or any other query intent that was discussed with regard to the candidate entity (e.g., an entity property of the candidate entity). In many examples, the candidate intent and the candidate entity occur in a same user utterance of the set of user utterances. For example, in FIG. 2G, the candidate entity is Bill Gates, and the candidate intent is "net worth" which was previously described with regard to Bill Gates. Searching for the candidate entity based on entity constraints/entity properties may be performed in any suitable fashion, e.g., as described above with regard to coreference resolution. For example, Jeff Bezos has many entity constraints that can be determined based on looking up Jeff Bezos in a knowledge base or web search. As depicted in the example, entity constraints for Jeff Bezos correspond closely to entity properties of Bill Gates—for example, both entities may have a defined "FoundedCompany" property and a "NetWorth" property, and similar entity types (e.g., "human," "founder").

At 408, method 400 includes rewriting the candidate utterance as a rewritten utterance that includes the candidate intent and that replaces the candidate entity with the suggested entity. For example, in FIG. 2G, possible rewritten utterance 218G is user utterance 208G with candidate entity "Bill Gates" replaced with suggested entity "Jeff Bezos."

At 410, method 400 includes outputting the rewritten utterance to one or more query answering machines. As with coreference resolution, after resolving suggested/corrected entities, the rewritten utterance may be suitable for downstream processing by query answering machines, without needing any further context from a computer-accessible conversation history 202. For example, in FIG. 2G, rewritten utterance 218G is a fully-defined query about Jeff Bezos's net worth.

In some examples, method 400 further includes using the predefined language model to recognize one or more entity properties of the suggested entity in the unresolved user utterance, wherein the entity constraints associated with the suggested entity include the one or more entity properties of the suggested entity. In the example shown in FIG. 2G, in addition to determining the full name Jeff Bezos, the predefined language model may be operated to look up properties/types for Jeff Bezos, e.g., to determine that Jeff Bezos has type "person" and "founder," and has gender "male." Alternately, if instead of referring to "Jeff Bezos" the user had referred to "the founder of Amazon" in unresolved user utterance 216G, the predefined language model may be operated to look up properties/types for "the founder of Amazon," such as a "FoundedCompany=Amazon" property, a "person" type, and/or a "founder" type. In some examples, method 400 further includes using the predefined language model to recognize a verb predicate in the unresolved user utterance, for example, "founder" implies a "founded company" predicate. Accordingly, entity constraints associated with the suggested entity include the verb predicate, and wherein searching the set of previously-resolved entities for the candidate entity includes finding a subset of previously-resolved entities having a defined value for an entity property indicating the verb predicate. Relationships between predicate phrases, entity properties, entity types, and entity constraints may be determined in any suitable fashion, for example, based on example data obtained from human users. In some examples, relationships between predicate phrases, entity properties, entity types, and/or entity constraints may be represented as a computer-accessible dictionary, database, and/or knowledge base, including any suitable mappings between related predicate phrases, entity properties, entity types, and/or entity constraints. In some examples, such relationships may be determined by a machine learning function. For example, the machine learning function may be configured to assess a confidence value for a particular relationship. Alternately or additionally, the machine learning function may be configured to receive a predicate phrase, entity property, entity type, or entity constraint, and to output one or more related predicate phrases, entity properties, entity types, and/or entity constraints.

In some examples, a user may suggest talking about a time and location by implicitly referring to a current time and/or location. For example, the methods of the present disclosure can deduce that "how about the weather?" is likely asking about the weather with regard to a current time and location. Accordingly if a user in Portland, Oreg. asks "how about the weather?" at 4:00 PM on Jan. 1, 2020, the query can be rewritten by appending the current time and location to the query, as in "what is the weather in Portland, Oreg. at 4:00 PM on Jan. 1, 2020?". However, in some examples, the methods of the present disclosure may be configured to deduce that a different time/location is relevant with a relatively higher confidence, for example, if a specific time/location was mentioned in a previous utterance in the conversation history. For example, if the user asked, "is there a concert at the Oregon Zoo tomorrow?" and subsequently asked "how about the weather?" then the methods of the present disclosure may assess a relatively higher confidence for the time being "tomorrow" and the location being "the Oregon Zoo," instead of the current time and current location.

FIG. 2I shows an example of a "suggest intent" speech act in an unresolved user utterance 216I that has already been pre-processed by coreference resolution machine 102 and classified as a "suggest intent" speech act by speech act classifier machine 110. The computer-accessible conversation history 202I includes discussion of Bill Gates's net worth. Unresolved user utterance 216I is a "suggest intent" speech act in which the user establishes a new query intent to be discussed with regard to the same entity, Bill Gates. As with suggesting/correcting entities, the "suggest intent" speech act may be detected by speech act classifier machine 110 in any suitable manner, e.g., as indicated by the words "what about" from the unresolved user utterance, or as indicated by any other indicator words/phrases such as "how about" or "regarding." If the "suggest intent" speech act is detected, then the remainder of the user utterance may be assessed to define a user intent regarding a new topic, namely "yearly income." Then, based on the user's intent to discuss "yearly income", the original user utterance 208I may be rewritten to incorporate the intent suggestion, e.g., by replacing "net worth" with "yearly income" in the rewritten utterance 218I. Note that the unresolved user utterance 216G, "What about yearly income?" does not mention any entity so is not a fully-formed query that could be answered without first rewriting to mention the relevant entity.

Figure 5:
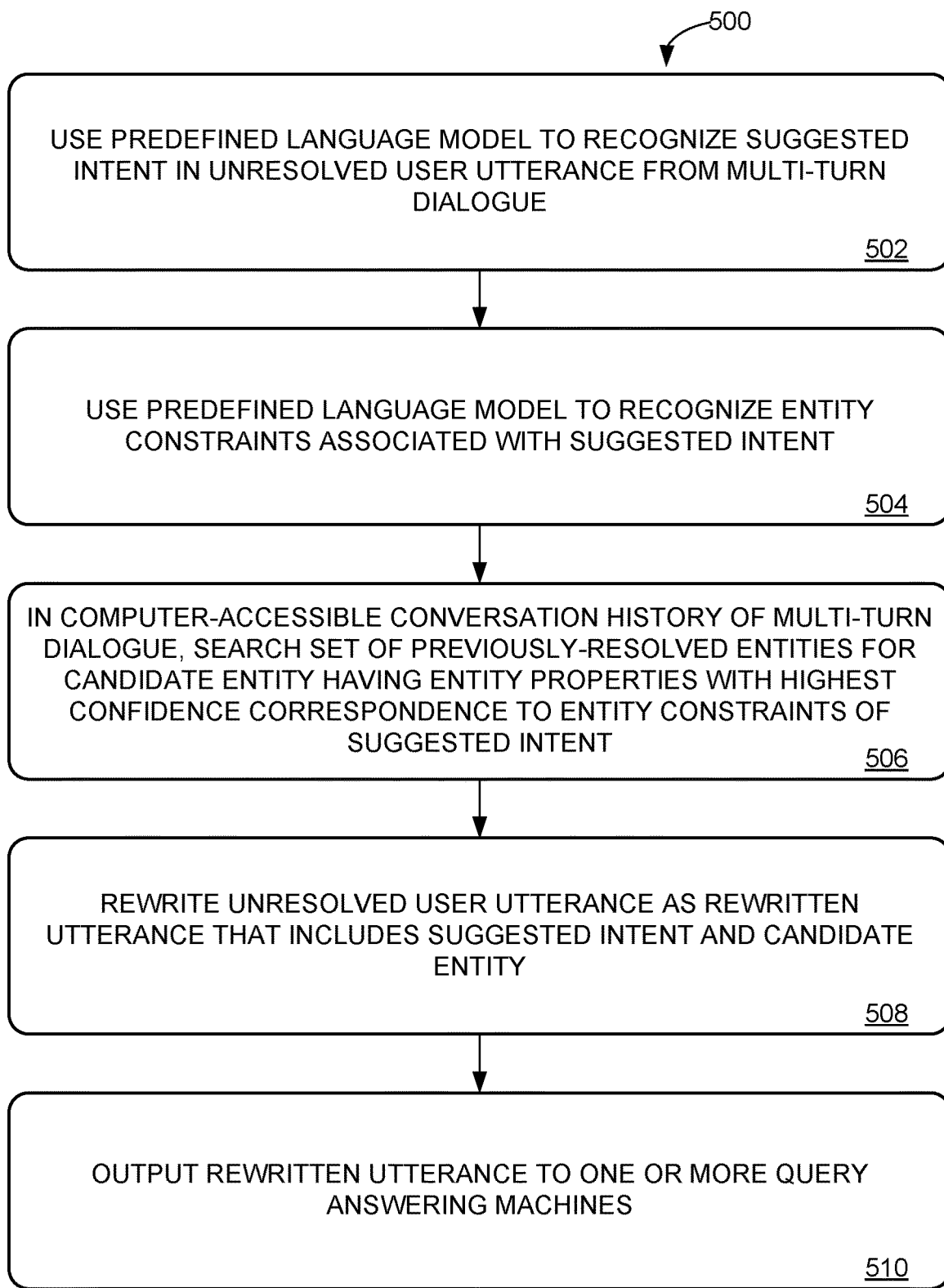
FIG. 5 shows a method for resolving a suggested intent in a user utterance.

Accordingly, FIG. 5 shows a method 500 for disambiguating user queries in a multi-turn dialogue including a set of user utterances by resolving entity suggestions and/or corrections. Intent suggestion resolver machine 120 may be configured to implement method 500.

At 502, method 500 includes using a predefined language model to recognize a suggested intent in an unresolved user utterance from the multi-turn dialogue. As with detection of suggested entities, any suitable predefined language model may be used to detect the suggested intent based on any suitable criteria, for example by detecting a phrase such as "what about?" or "how about?".

At 504, method 500 includes using the predefined language model to recognize entity constraints associated with the suggested intent. For example, the suggested intent may be defined with regard to an entity property, e.g., in FIG. 2I, the intent is to ask about the "yearly income" entity property. Accordingly, the entity constraints from the unresolved user utterance 216I may be related to the same entity property, e.g., a constraint "HasDefineeroperty=YearlyIncome."

At 506, method 500 includes, in a computer-accessible conversation history of the multi-turn dialogue, searching a set of previously-resolved entities for a candidate entity having entity properties with a highest confidence correspondence to the entity constraints of the suggested intent. Confidence of correspondence may be determined in any suitable manner, e.g., as described above with regard to FIG. 3. For example, in FIG. 2I, Bill Gates has the "YearlyIncome" property defined by the intent, whereas Paul Allen (who is deceased) does not have this property. Accordingly, Bill Gates has a higher confidence correspondence to the entity constraints of the suggested intent.

At 508, method 500 includes rewriting the unresolved user utterance as a rewritten utterance that includes the suggested intent and the candidate entity. For example, in FIG. 2I, rewritten utterance 218I includes the suggested intent, "yearly income" and the candidate entity, "Bill Gates."

At 510, method 500 includes outputting the rewritten utterance to one or more query answering machines. As with coreference resolution, after resolving suggested intents, the rewritten utterance may be suitable for downstream processing by query answering machines, without needing any further context from the computer-accessible conversation history 202. For example, in FIG. 2I, rewritten utterance 218I is a fully-defined query about Bill Gates's yearly income. In some examples, the candidate entity is previously resolved from one of the automated assistant utterances in the computer-accessible conversation history 202I, e.g., in FIG. 2I, Bill Gates is first mentioned in agent utterance 206I. Alternately or additionally, the candidate entity may be resolved from a user utterance, e.g., an earlier user utterance could explicitly mention Bill Gates.

In some examples, recognizing the suggested intent further includes recognizing a predicate rewrite pattern associated with the suggested intent. For example, the predefined language model may be operable to determine, for a given suggested intent, one or more relevant predicate rewrite patterns, wherein rewriting the unresolved user utterance as the rewritten utterance includes applying the predicate rewrite pattern to the candidate entity. For example, the predefined language model may associate a plurality of predefined intents to predicate rewrite patterns. In some examples, the predefined language model may include a computer-accessible dictionary, database, or knowledge base including a plurality of different predefined intents, and for each predefined intent, the one or more relevant predicate rewrite patterns. In some examples, the predefined language model may include a machine learning function configured to receive a predefined intent, and output a predicate rewrite pattern. As a specific example, for "yearly income" intent, the predefined language model may include a predefined pattern: "what is the yearly income of <candidate entity>" where "<candidate entity>" may be replaced with the appropriate candidate entity. This exemplary predicate rewrite pattern would result in the rewritten utterance 218I shown in FIG. 2I.

If the predefined language model fails to find a predicate rewrite pattern for a given intent, the query can be rewritten according to general, predefined rules. Non-limiting examples of general rules for rewriting the unresolved user utterance include using a predefined connecting string or replacing portions of a template string as defined herein. In some examples, the suggested intent includes an entity property of interest, and the entity constraints include a defined value for the entity property of interest. In FIG. 2I, the suggested intent includes the "yearly income" property of interest, and Bill Gates has a defined value for this property. Accordingly, in some examples, rewriting the unresolved user utterance as the rewritten utterance includes concatenating the entity property of interest, a predefined connecting string, and the candidate entity. For example, the predefined connecting string could be "is", "of," or a blank space (" "). Accordingly, the rewritten utterance 218I in FIG. 2I could be alternately rewritten, for example, as "yearly income of Bill Gates." Rules based on replacing portions of a template string may be defined for various natural languages in any suitable fashion. In English, if the predicate phrase is a noun phrase, a non-limiting example of a template string is "<predicate phrase> of <candidate entity>", wherein the bracketed portions are designated to be replaced with the predicate phrase and candidate entity, respectively. As another non-limiting example the predicate phrase is a phrase of the form "how <adjective>" for some adjective of interest, then the query can be rewritten "how <adjective> is <candidate entity>". Otherwise, more generally, the intent suggestion resolver machine 120 is configured to rewrite the query by replacing portions of the template string "<predicate phrase><subject entity>." It is believed that similarly general rules may be implemented for any natural language, so as to facilitate rewriting the unresolved user utterance to include suggested intent and the candidate entity.

In some examples, coreference resolution, intent suggestion resolution, and/or entity suggestion/correction resolution may not succeed in resolving each and every possible ambiguity from an unresolved user utterance. For example, there may be one or more coreferences that cannot be resolved to a single unambiguous entity, either because a search for a matching entity yielded zero entities having sufficient relevance (e.g., zero entities with a confidence value above a predefined threshold), or because the search yielded two or more matching entities having similar relevance (e.g., based on having the same or similar confidence value). Alternately, a suggested intent or entity may not be resolvable based on the computer-accessible conversation history, for example if a suggested intent is mentioned but the suggested intent does not pertain to any entity from the history, or if a suggested entity is mentioned but does not pertain to any intent from the history. Accordingly, to respond to the user utterance, it may be necessary to obtain additional information about what entities/intents are pertinent.

As such, there may be an inherent ambiguity still present in the rewritten utterance that cannot be resolved, even using the context provided by the computer-accessible conversation history. As such, even given the rewritten utterance, speech act classifier machine 110 may not classify the rewritten utterance as a "fully resolved question," "greeting," "acknowledgement," "rejection," "suggest entity," "correct entity," or "suggest intent" speech act. Accordingly, to address the inherent ambiguity, the utterance may be processed by a clarification skill machine 116 configured to detect the ambiguity and output a clarifying question to get a clarifying response from the user. Clarification skill machine 116 will be described further below with regard to FIGS. 2J-2M and 6. Furthermore, a user utterance may be a clarifying response that was provided by the user responsive to a clarifying question. Based on the clarifying response occurring subsequent to the clarifying question, and/or based on words occurring in the clarifying response (e.g., "I mean"), speech act classifier machine 110 may classify the clarifying response as a "clarification" speech act, and delegate the clarifying response to be handled by a clarification resolution machine 122 configured to disambiguate previous user utterance(s) based on the clarifying response.

Figure 2J:
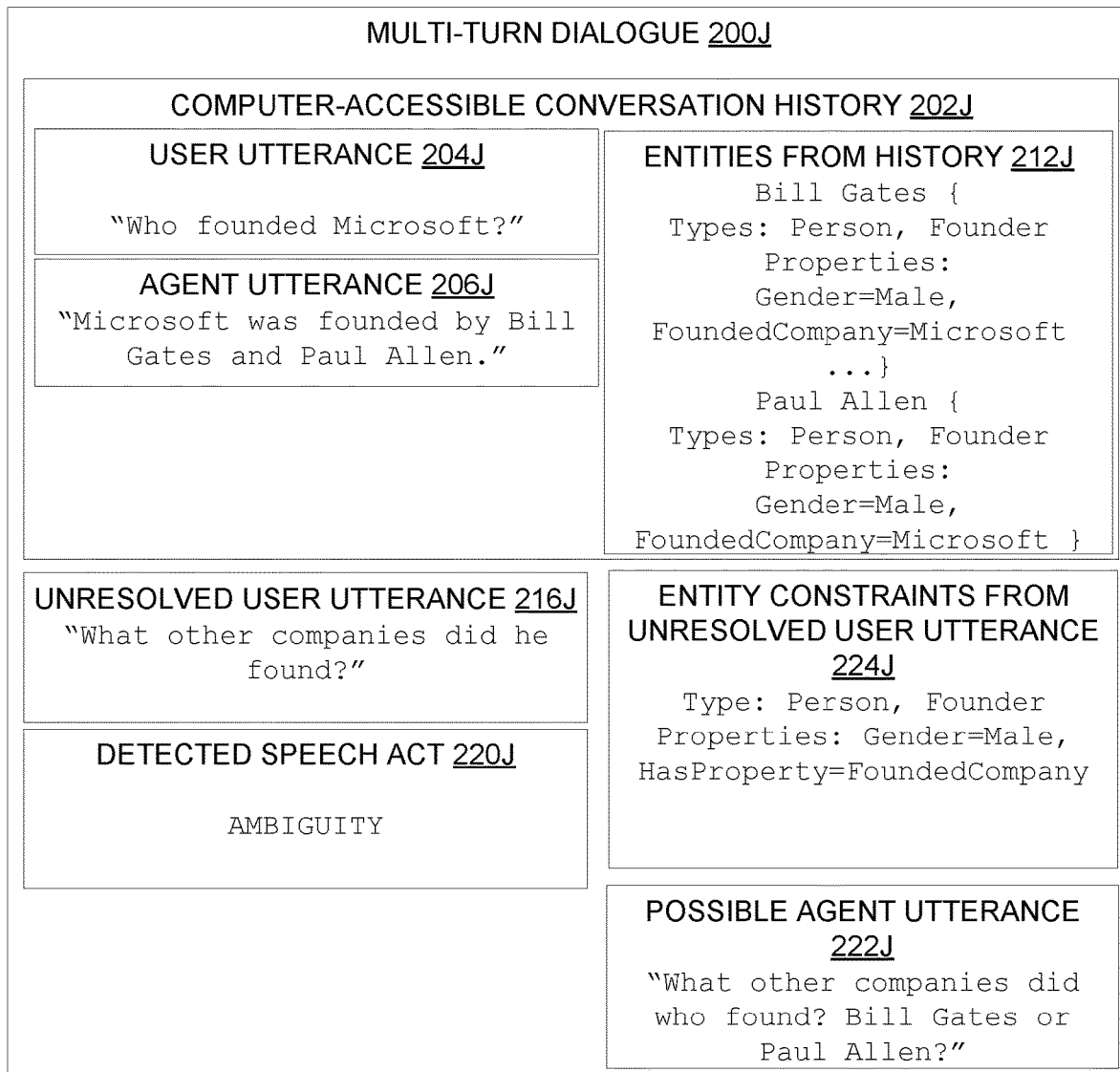

FIG. 2J shows an example of an ambiguous user utterance that is detected as an ambiguity which cannot be fully resolved via coreference resolution, entity suggestion/correction resolution, and/or intent suggestion resolution. The unresolved user utterance 216J uses the pronoun "he" and is associated with an entity who founded a company. However, these properties could match either of the entities 212J from the history, namely Bill Gates or Paul Allen. Since "he" cannot be resolved to a single distinct entity, and since there are no additional properties that more closely correspond to either Bill Gates or Paul Allen, the detected speech act 220J is "ambiguity."

Figure 2K:
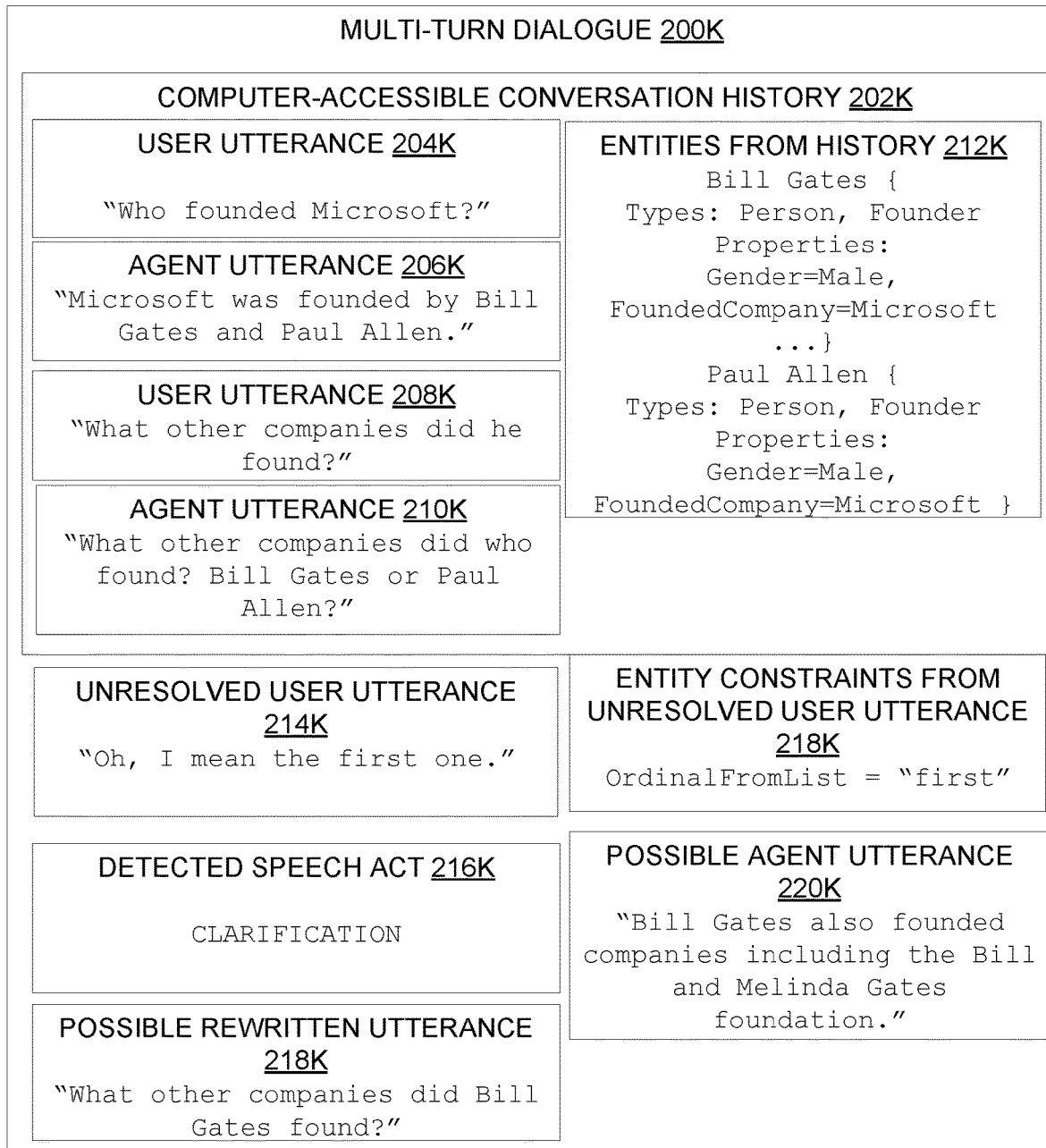

FIG. 2K shows an example of a clarifying question output in an agent utterance 210K and a corresponding clarifying response in an unresolved user utterance 214K. The speech act classifier machine 110 may be programmed and/or trained to detect a clarification speech act which can be used to disambiguate a previous ambiguous user utterance 208K. As an example, the speech act classifier machine may be trained to detect a clarification speech act based on words in the clarifying response (e.g., "I mean") and/or based on having previously output the clarifying question. Returning to the example in FIG. 2K, in unresolved user utterance 214K, the user clarifies that they mean "the first one," which can be resolved (e.g., by coreference resolution methods described herein) to refer to "Bill Gates" from the ordered list including "Bill Gates and Paul Allen." Any other suitable reference could be used for clarification and may be resolved to an entity 212K from the history using any methods described herein, for example, a partial name such as "Bill" may be resolved using coreference resolution methods described herein. After resolving the disambiguated entity, the original, ambiguous user utterance (e.g., 208K in FIG. 2K) can be rewritten to replace the ambiguous entity (e.g., "he") with the disambiguated entity (e.g., "Bill Gates"), as in possible rewritten utterance 218K.

FIG. 2J shows another example of an ambiguous user utterance that is detected as an ambiguity which cannot be fully resolved via coreference resolution, entity suggestion/correction resolution, and/or intent suggestion resolution. The unresolved user utterance 216J uses the pronoun "she" and is associated with an entity who founded a company. However, the "female" gender of the "she" pronoun does not match the gender property for any of the entities 212J from conversation history 202J, namely Bill Gates or Paul Allen. Since "she" cannot be resolved to a single distinct entity, the detected speech act 220J is "ambiguity." Although the user is interested in asking about companies founded by a female person, there are no such entities 212J in the history, so the question is ambiguous, because the conversation history 202J does not include enough information to resolve the ambiguity.

Figure 2L:
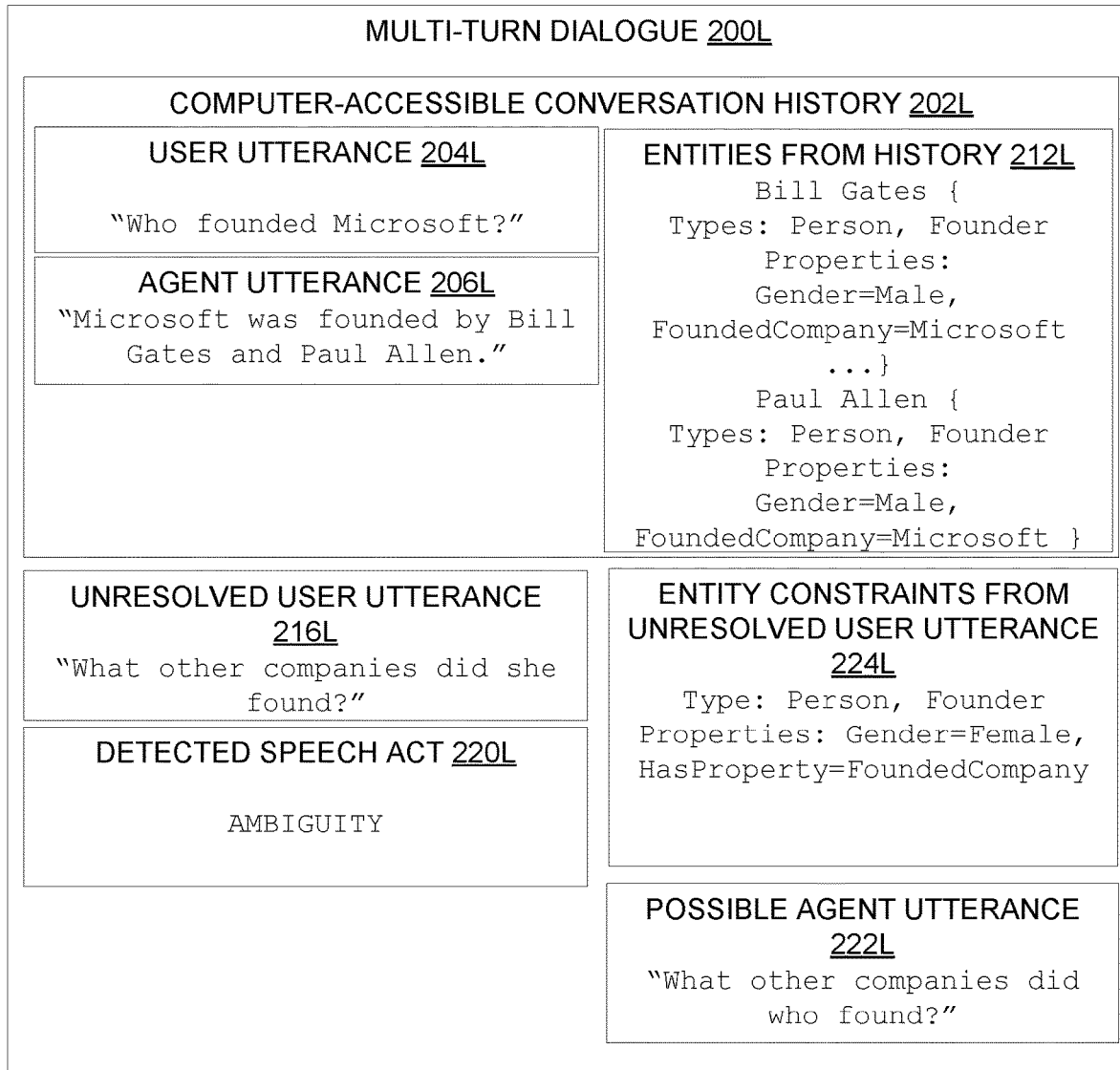
Figure 2M:
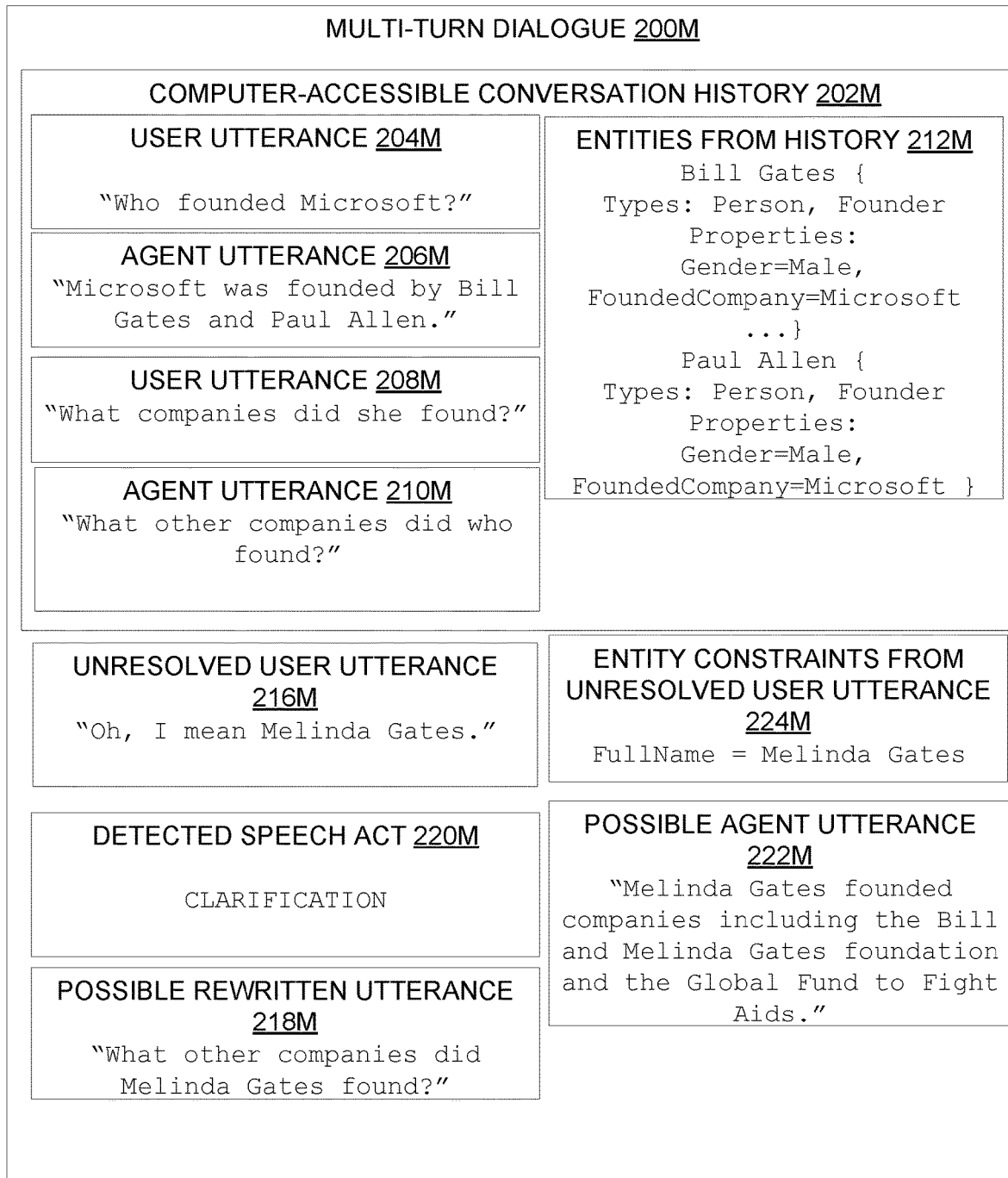

FIG. 2M shows another example of a clarifying question output in an agent utterance 210M and a corresponding clarifying response in an unresolved user utterance 216M. The clarifying response is detected as a clarification speech act which can be used to disambiguate a previous ambiguous user utterance 208M. The user clarifies that they actually wanted to ask about "Melinda Gates," even though she was not yet tracked in the entities 212M from the history. As with other examples, the clarifying entity can be resolved using any techniques described herein, e.g., via coreferences. For example, instead of specifying "Oh, I mean Melinda Gates," the user could alternately specify "I mean Bill's wife," or "I mean Melinda," and based on the context already in the computer-accessible conversation history 202, these specifications could be resolved to "Melinda Gates," e.g., based on an established relationship between the Bill Gates and Melinda Gates entities. After resolving the disambiguated entity, the original, ambiguous user utterance (e.g., 208M in FIG. 2M) can be rewritten to replace the ambiguous entity (e.g., "she") with the disambiguated entity (e.g., "Melinda Gates") as in possible rewritten utterance 218M.

Figure 6:
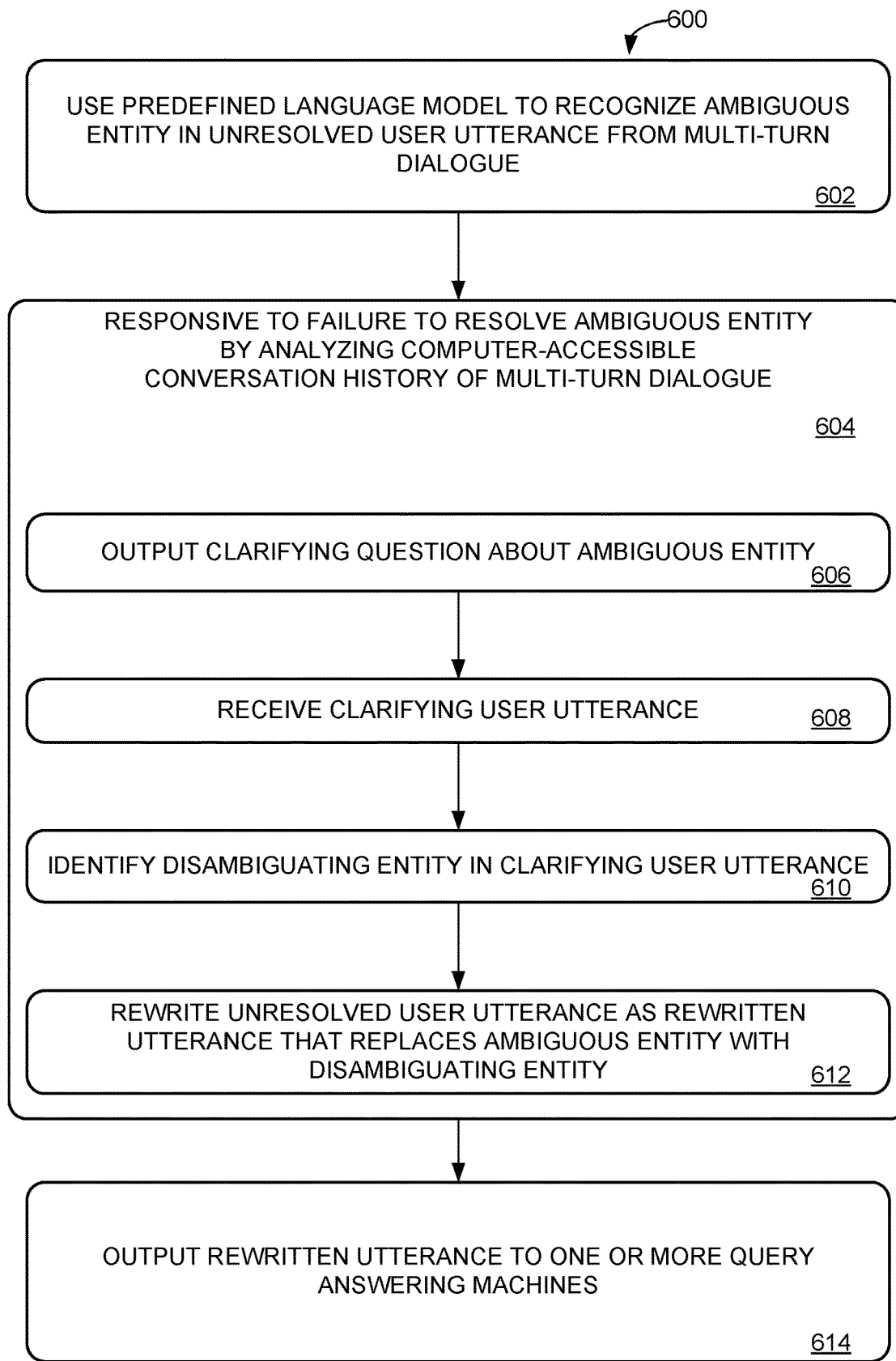
FIG. 6 shows a method for clarifying an ambiguous user utterance.

Accordingly, FIG. 6 shows a method 600 of disambiguating user queries in a multi-turn dialogue including a set of user utterances, by using a clarifying question to get additional information from the user. Clarification skill machine 116 and/or clarification resolution machine 122 may be configured to implement method 600.

At 602, method 600 includes using a predefined language model to recognize an ambiguous entity in an unresolved user utterance from the multi-turn dialogue. For example, the ambiguous entity could be defined by a coreference that is ambiguously resolved to two or more entities, a coreference that cannot be resolved to any entity, or a suggested intent that cannot be resolved to refer to any entity, or a suggested intent that potentially refers to two or more different entities.

At 604, method 600 includes attempting to resolve the ambiguous entity by analyzing a computer-accessible conversation history of the multi-turn dialogue. The analysis can include coreference resolution, suggested/corrected entity resolution, suggested intent resolution, or any other technique(s) described herein. For example, the analysis may include using the predefined language model to recognize an initial unresolved entity in the unresolved user utterance, using the predefined language model to recognize entity constraints of the initial unresolved entity, and in the computer-accessible conversation history of the multi-turn dialogue, searching a set of previously-resolved entities for a resolving entity having entity properties corresponding to the entity constraints of the initial unresolved entity.

If the resolving entity can be found in the set of previously-resolved entities, then the ambiguous entity can be disambiguated by the analysis. Accordingly, the user utterance can be rewritten in disambiguated form, for example as described above with regard to coreference resolution, suggested/corrected entity resolution, and/or suggested intent resolution. Accordingly, no further clarification is needed and at 614, the rewritten user utterance can be output to one or more query answering machines.

However, in some cases, as in FIGS. 2J and 2L, the resolving entity is not included in the set of previously-resolved entities. As such, the ambiguous entity cannot be disambiguated by the analysis (e.g., because there are either zero candidate entities from the history suitable for disambiguation, or because there are two or more equally-likely candidate entities).

Responsive to failing to disambiguate the ambiguous entity through the analysis, method 600 further includes, at 606, outputting a clarifying question about the ambiguous entity. Method 600 further includes, at 608, receiving a clarifying user utterance. Accordingly, at 610, method 600 further includes identifying a disambiguating entity in the clarifying user utterance using any of the methods of the present disclosure, for example by operating the predefined language model to identify an entity mentioned in the clarifying user utterance, and using coreference machine 102 to resolve the entity with regard to a coreference in the original, ambiguous user utterance. For example, FIGS. 2K and 2M show exemplary clarifying questions and clarifying responses.

In some examples, attempting to resolve the ambiguous entity includes determining that the ambiguous entity is an ambiguous reference to two or more entities, wherein the clarifying question is a request to select one of the two or more entities. For example, the clarifying question may include an ordered list of the two or more entities, and accordingly identifying the disambiguating entity in the clarifying user utterance may include identifying the disambiguating entity by an ordinal number reference to the ordered list of the two or more entities. As shown in FIG. 2K, there are two different entities which could match the ambiguous entity from user utterance 208K, namely Bill Gates and Paul Allen. Accordingly, the clarifying question mentions these options to aid the user in disambiguation: "What other companies did who found? Bill Gates or Paul Allen?". Furthermore, the clarifying response refers back to these choices, by clarifying that the user meant "the first one," namely Bill Gates. Alternately or additionally, identifying the disambiguating entity in the clarifying user utterance may include identifying the disambiguating entity by a partial entity name included in the clarifying user utterance, for example, the clarifying user utterance could have specified "Bill" or "Gates" instead of "the first one."

In some examples, attempting to resolve the ambiguous entity includes determining that the ambiguous entity cannot be resolved to any entity, and accordingly the clarifying question is a request for the user to explicitly indicate the disambiguating entity. In FIG. 2M, there are no entities 212M from the history which could match the ambiguous entity from user utterance 208M, because of the mismatch between the gender of the ambiguous entity and the tracked entities 212M from the history. Accordingly, the clarifying question does not list options but instead simply asks the user to clarify: "What other companies did who found?". Accordingly, the user's clarifying response specifies a particular person "Melinda Gates," although as described above, the user's clarifying response could instead specify "Melinda Gates" via a coreference or any other suitable description, e.g., "Bill Gates's wife." In any case, the user's clarifying response is resolved to determine the disambiguating entity, namely "Bill Gates" in the example in FIG. 2K and "Melinda Gates" in the example in FIG. 2M.

At 612, method 600 includes rewriting the unresolved user utterance as a rewritten utterance that replaces the ambiguous entity with the disambiguating entity. The rewritten utterance is disambiguated to mention the disambiguating entity explicitly, so that it may be processed by downstream query answering machines without any further need for disambiguation or analysis of a computer-accessible conversation history 202. Accordingly, at 614, method 600 includes outputting the rewritten utterance to one or more query answering machines.

In some examples, method 600 includes using the predefined language model to recognize entity constraints of the ambiguous entity and entity properties of the disambiguating entity. Accordingly, identifying the disambiguating entity in the clarifying user utterance includes determining whether the entity constraints correspond to the entity properties with a sufficient confidence. In some examples, the disambiguating entity is one of a plurality of candidate entities and the sufficient confidence is a highest confidence among the plurality of candidate entities. In some examples, the sufficient confidence is any confidence value exceeding a predefined threshold confidence. The confidence of correspondence may be determined in any suitable fashion, for example as described above with regard to FIG. 3.

Outputting the clarifying question at 606 may be performed in any suitable manner. In some examples, method 600 includes using the predefined language model to determine a predicate clause of the unresolved user utterance. The predicate clause may be any relevant phrase from the unresolved user utterance, for example, relating to an entity property of interest or any other query intent. Accordingly, the predicate clause may indicate what aspect of the unresolved user utterance requires clarification. For example, if the user asks "what else did she sing?" without mentioning any particular singer, then "singer" may be used as a predicate clause describing the ambiguous entity. Accordingly, the clarifying question may mention the predicate clause, e.g., "what else did who sing?" or "what else did which singer sing?". In some examples, the predefined language model may be used to recognize an entity property of the ambiguous entity, wherein the clarifying question mentions the entity property. For example, in FIG. 2K, the user is interested in the "FoundedCompany" property with regard to an ambiguous entity. Accordingly, the clarifying question mentions the property by asking, "what other companies did who found? Bill Gates or Paul Allen?".

In some examples, outputting the clarifying question includes generating a parse graph for the unresolved user utterance and selecting a connected sub-graph of the parse graph. In some examples, the connected sub-graph of the parse graph includes a root node of the parse graph. For example, the parse graph may be a dependency parse tree which identifies a root word of the unresolved user utterance and a clause relationship between clauses in the utterance. Accordingly, selecting an appropriate connected sub-graph may include finding a "question word" from the unresolved user utterance, e.g., "who", "what," "where," "was," and the like, wherein the question word is nearest to an ambiguous coreference in the unresolved user utterance. For example, in FIG. 2M, the ambiguous coreference is "she" and the related question word is "what." Outputting the clarifying question may further include replacing the ambiguous coreference with another question word, e.g., "who," as shown in FIG. 2M.

In some particular human languages, a particular coreference word may occur in different parts of speech. For example in English, "her" can occur as part of a noun and could be replaced by the question word "whose" for question generation, e.g., "who is her child" could be rewritten as "who is whose child?". Alternately, "her" can occur as a pronoun, as in "when did Tom Hanks marry her?" which could be rewritten as "when did Tom Hanks marry whom?".

In some examples, the ambiguous entity is an ambiguous coreference. Accordingly, the clarifying question may include a rewritten phrase from the unresolved user utterance that replaces the ambiguous coreference with a question word associated with the ambiguous coreference, so as to indicate what coreference needs to be clarified in the user's clarification response. For example, in FIG. 2M, the user utterance 208M includes the ambiguous coreference "she" and the agent utterance 210M asks, "what other companies did who found?". The agent utterance 210M formulates the clarifying question by replacing the ambiguous coreference "she" from user utterance 208M with a related question word, "who."

In some examples, a clarifying response may fail to sufficiently disambiguate the original unresolved user utterance. For example, entities mentioned in the clarifying response may not correspond with sufficient confidence to an ambiguous coreference or suggestion from the unresolved user utterance. Accordingly, resolving an ambiguity with the clarification resolution machine 122 and/or clarification skill 116 may include making multiple attempts to resolve the ambiguity. Accordingly, responsive to the entity constraints failing to correspond to the entity properties with at least the sufficient confidence, clarification skill 116 may be configured to output an additional clarifying question and to receive an additional clarifying user utterance. In this manner, a number of clarifying questions may be output before eventually disambiguating the original unresolved user utterance.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
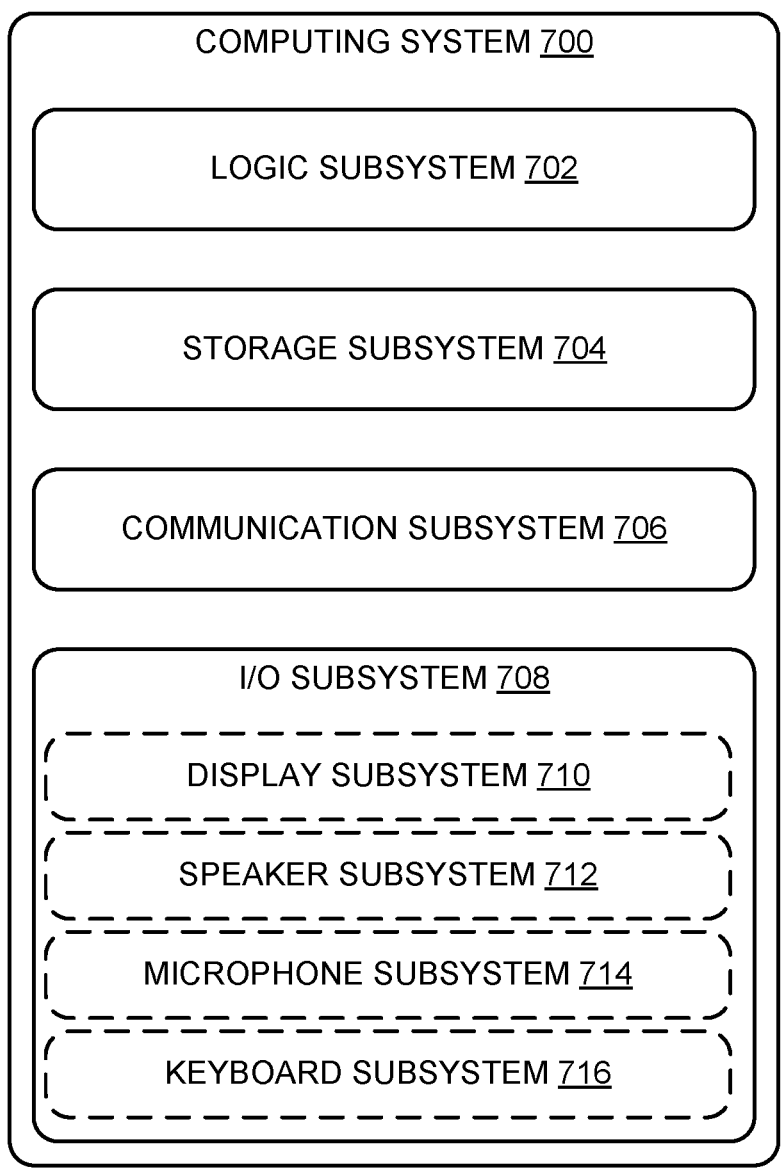
FIG. 7 shows an exemplary computer system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, personal assistant computing devices, and/or other computing devices.

Computing system 700 includes a logic subsystem 702 and a storage subsystem 704. Computing system 700 may optionally include an input/output (I/O) subsystem 708, communication subsystem 706, and/or other subsystems not shown in FIG. 7. In some examples, I/O subsystem 708 includes a microphone subsystem 714 configured to receive user utterances from a user in the form of audible speech, a keyboard subsystem 716 configured to receive user utterances from a user in the form of text, a display subsystem 710 configured to output agent utterances in the form of text, and/or a speaker subsystem 712 configured to output agent utterances in the form of audible speech.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions.

Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to enact the dataflow architecture 100 of FIG. 1 and/or to instantiate one or more logic machines (e.g., coreference resolution machine 102, entity suggestion/correction resolver machine 118, clarification resolution machine 122, greet/ack/reject response machine 112, query answering machines 114, and clarification skill machine 116), and/or to instantiate computer accessible conversation histories 202.

As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques, as well as hard-coded or other programmer-defined computing functions. It should be understood that all of the decisions, inferences, detections, and other logic described above with reference to FIGS. 2A-2M may be programmatically performed by corresponding machines and/or other computing entities of computing system 700.

Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models (e.g., any predefined language model(s) referred to herein) may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AT) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 710 may be used to present a visual representation of data held by storage subsystem 704. This visual representation may take the form of a graphical user interface (GUI). Display subsystem 710 may include one or more display devices utilizing virtually any type of technology. In some implementations, display subsystem may include one or more virtual-, augmented-, or mixed reality displays.

When included, I/O subsystem 708 may comprise or interface with one or more input devices, for example microphone subsystem 714 and/or keyboard subsystem 716. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 706 may be configured to communicatively couple computing system 700 with one or more other computing devices. Communication subsystem 706 may include wired and/or wireless communication devices compatible with one or more different communication protocols. The communication subsystem may be configured for communication via personal-, local- and/or wide-area networks.

In an example, a method of disambiguating user queries in a multi-turn dialogue including a set of user utterances comprises: using a predefined language model to recognize an ambiguous entity in an unresolved user utterance from the multi-turn dialogue; using the predefined language model to recognize entity constraints of the ambiguous entity; in a computer-accessible conversation history of the multi-turn dialogue, searching a set of previously-resolved entities for a candidate entity having entity properties with a highest confidence correspondence to the entity constraints of the ambiguous entity; rewriting the unresolved user utterance as a rewritten utterance that replaces the ambiguous entity with the candidate entity; and outputting the rewritten utterance to one or more query answering machines. In this or any other example, the entity constraints of the ambiguous entity include a partial name of the ambiguous entity, and wherein searching the set of previously-resolved entities for the candidate entity includes finding a subset of previously-resolved entities having a full name consistent with the partial name. In this or any other example, the ambiguous entity in the unresolved user utterance includes a pronoun, the entity constraints of the ambiguous entity include a pronoun gender, and wherein searching the set of previously-resolved entities for the candidate entity includes finding a subset of previously-resolved entities having a gender consistent with the pronoun gender. In this or any other example, the ambiguous entity in the unresolved user utterance includes an ordinal number reference to an ordered list of entities from the multi-turn dialogue, and wherein the candidate entity is a corresponding entry from the ordered list of entities. In this or any other example, the method further comprises using the predefined language model to recognize a verb predicate derived from the unresolved user utterance, wherein the entity constraints of the ambiguous entity include the verb predicate, and wherein searching the set of previously-resolved entities for the candidate entity includes finding a subset of previously-resolved entities having a defined value for the verb predicate. In this or any other example, the entity constraints of the ambiguous entity include a dependency relationship between the ambiguous entity and a base entity, and wherein searching for the candidate entity includes searching for the base entity, and automatically resolving the candidate entity using the dependency relationship between the ambiguous entity and the base entity. In this or any other example, the multi-turn dialogue further includes a set of automated assistant utterances, and wherein the candidate entity is previously resolved from one of the automated assistant utterances. In this or any other example, searching the set of previously resolved entities for the candidate entity includes resolving an entity type based on the entity constraints of the ambiguous entity, and wherein searching the set of previously resolved entities for the candidate entity includes finding a subset of previously resolved entities having a matching entity type.

In an example, a method of disambiguating user queries in a multi-turn dialogue including a set of user utterances comprises: using a predefined language model to recognize a suggested intent in an unresolved user utterance from the multi-turn dialogue; using the predefined language model to recognize entity constraints associated with the suggested intent; in a computer-accessible conversation history of the multi-turn dialogue, searching a set of previously-resolved entities for a candidate entity having entity properties with a highest confidence correspondence to the entity constraints of the suggested intent; rewriting the unresolved user utterance as a rewritten utterance that includes the suggested intent and the candidate entity; and outputting the rewritten utterance to one or more query answering machines. In this or any other example, the multi-turn dialogue further includes a set of automated assistant utterances, and wherein the candidate entity is previously resolved from one of the automated assistant utterances. In this or any other example, the suggested intent includes an entity property of interest, and wherein the entity constraints include a defined value for the entity property of interest. In this or any other example, rewriting the unresolved user utterance as the rewritten utterance includes concatenating the entity property of interest, a predefined connecting string, and the candidate entity. In this or any other example, recognizing the suggested intent further includes recognizing a predicate rewrite pattern associated with the suggested intent, and wherein rewriting the unresolved user utterance as the rewritten utterance includes applying the predicate rewrite pattern to the candidate entity.

In an example, a method of disambiguating user queries in a multi-turn dialogue including a set of user utterances comprises: using a predefined language model to recognize a suggested entity in an unresolved user utterance from the multi-turn dialogue; using the predefined language model to recognize entity constraints associated with the suggested entity; in a computer-accessible conversation history of the multi-turn dialogue, searching a set of previously-resolved entities for a candidate entity having entity properties with a highest confidence correspondence to the entity constraints of the suggested entity, a candidate utterance including the candidate entity, and a candidate intent associated with the candidate entity; rewriting the candidate utterance as a rewritten utterance that includes the candidate intent and that replaces the candidate entity with the suggested entity; and outputting the rewritten utterance to one or more query answering machines. In this or any other example, the candidate intent and the candidate entity occur in a same user utterance of the set of user utterances. In this or any other example, the method further comprises using the predefined language model to recognize one or more entity properties of the suggested entity in the unresolved user utterance, wherein the entity constraints associated with the suggested entity include the one or more entity properties of the suggested entity. In this or any other example, the method further comprises using the predefined language model to recognize a verb predicate in the unresolved user utterance, wherein the entity constraints associated with the suggested entity include the verb predicate, and wherein searching the set of previously-resolved entities for the candidate entity includes finding a subset of previously-resolved entities having a defined value for an entity property indicating the verb predicate. In this or any other example, the entity constraints of the suggested entity include a partial name of the suggested entity, and wherein searching the set of previously-resolved entities for the candidate entity includes finding a subset of previously-resolved entities having a full name consistent with the partial name. In this or any other example, the suggested entity in the unresolved user utterance includes an ordinal number reference to an ordered list of entities from the multi-turn dialogue, and wherein the candidate entity is a corresponding entry from the ordered list of entities. In this or any other example, the entity constraints of the suggested entity include a dependency relationship between the suggested entity and a base entity, and wherein searching for the candidate entity includes searching for the base entity, and automatically resolving the candidate entity using the dependency relationship between the suggested entity and the base entity.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A method of disambiguating user queries, the method comprising:
   obtaining a user utterance of a user, wherein the user utterance is part of a multi-turn dialogue between the user and an automated assistant;
   identifying an ambiguous entity referenced in the user utterance using a predefined language model;
   identifying properties of the ambiguous entity using the predefined language model and the user utterance;
   executing a search over a computer-readable conversation history of the multi-turn dialogue based upon the properties of the ambiguous entity, wherein the computer-readable conversation history comprises identifiers for entities that were referenced in the multi-turn dialogue and properties of the entities identified via the predefined language model;

identifying an entity referenced in the multi-turn dialogue based upon search results for the search;
rewriting the user utterance as a rewritten utterance, wherein the rewritten utterance includes an identifier for the entity in place of the ambiguous entity;
determining a classification of the rewritten utterance using a classifier; and
outputting the rewritten utterance to a skill in a plurality of skills used by the automated assistant based upon the classification, wherein the automated assistant performs an action specified by the skill based upon the rewritten utterance.

2. The method of claim 1, wherein the properties of the ambiguous entity include a partial name of the ambiguous entity, wherein the properties of the entities that were referenced in the multi-turn dialogue include full names of the entities, wherein the identifier for the entity comprises a full name of the ambiguous entity.

3. The method of claim 1, wherein the properties of the ambiguous entity include a pronoun having a gender, wherein the properties of the entities that were referenced in the multi-turn dialogue include genders for each of the entities, wherein the pronoun in the user utterance is replaced with the identifier for the entity.

4. The method of claim 1, wherein the properties of the ambiguous entity include an ordinal number reference to an ordered list of entities from the multi-turn dialogue, wherein the properties of the entities that were referenced in the multi-turn dialogue include an order in which the entities were mentioned, wherein the ordinal number reference is replaced with the identifier for the entity.

5. The method of claim 1, wherein the properties of the ambiguous entity include a verb predicate derived from the user utterance, the properties of the entities that were referenced in the multi-turn dialogue include a defined value for the verb predicate, wherein the rewritten utterance is based upon the defined value for the verb predicate.

6. The method of claim 1, wherein the properties of the ambiguous entity include a dependency relationship between the ambiguous entity and a base entity, wherein the properties of the entities that were referenced in the multi-turn dialogue include dependency relationships between different entities, wherein the rewritten utterance is based upon one or more of the dependency relationships.

7. The method of claim 1, wherein the multi-turn dialogue further includes a set of automated assistant utterances uttered by the automated assistant, wherein the search results for the search include an utterance from the set of automated assistant utterances.

8. The method of claim 1, wherein the skill is a search engine skill that transmits the rewritten utterance to a search engine.

9. The method of claim 1, wherein the properties of the entities are further identified via a knowledge base.

10. A method of disambiguating user queries, the method comprising:
obtaining a user utterance of a user, wherein the user utterance is part of a multi-turn dialogue between the user and an automated assistant;
identifying a suggested intent in the user utterance using a predefined language model;
identifying properties of the suggested intent using the predefined language model and the user utterance;
executing a search over a computer-readable conversation history of the multi-turn dialogue based upon the properties of the suggested intent, wherein the computer-readable conversation history comprises identifiers for entities that were referenced in the multi-turn dialogue and properties of the entities identified via the predefined language model;
identifying an entity referenced in the multi-turn dialogue based upon search results for the search;
rewriting the user utterance as a rewritten utterance, wherein the rewritten utterance includes an identifier for the entity and the suggested intent;
determining a classification of the rewritten utterance using a classifier; and
outputting the rewritten utterance to a skill in a plurality of skills used by the automated assistant based upon the classification, wherein the automated assistant performs an action specified by the skill based upon the rewritten utterance.

11. The method of claim 10, wherein the properties of the suggested intent include an entity property of interest, wherein identifying the entity is based upon matching the entity property to one or more of the properties of the entities in the multi-turn dialogue.

12. The method of claim 11, wherein rewriting the user utterance as the rewritten utterance includes concatenating the entity property of interest, a predefined connecting string, and the identifier for the entity.

13. The method of claim 10, wherein identifying the suggested intent is further based upon recognizing a predicate rewrite pattern in the user utterance associated with the suggested intent.

14. A method of disambiguating user queries, the method comprising:
obtaining a user utterance of a user, wherein the user utterance is part of a multi-turn dialogue between the user and an automated assistant;
identifying a suggested entity referenced in the user utterance using a predefined language model;
identifying properties of the suggested entity using the predefined language model and the user utterance;
executing a search over a computer-readable conversation history of the multi-turn dialogue based upon the properties of the suggested entity, wherein the computer-readable conversation history comprises identifiers for entities that were referenced in the multi-turn dialogue and properties of the entities identified via the predefined language model;
identifying an intent associated with the suggested entity based upon search results for the search;
rewriting the user utterance as a rewritten utterance, wherein the rewritten utterance includes the suggested entity and at least one word that is indicative of the intent;
determining a classification of the rewritten utterance based using a classifier; and
outputting the rewritten utterance to a skill in a plurality of skills used by the automated assistant based upon the classification, wherein the automated assistant performs an action specified by the skill based upon the rewritten utterance.

15. The method of claim 14, wherein the intent is associated with a previous utterance of the user in the multi-turn dialogue.

16. The method of claim 15, further comprising:
obtaining an answer to the question from the automated assistant; and
presenting the answer to the user.

17. The method of claim 14, wherein the properties of the entities are further identified via a knowledge base.

18. The method of claim 14, further comprising:
outputting the rewritten utterance to a second skill in the plurality of skills used by the automated assistant based upon the classification, wherein the automated assistant performs a second action specified by the second skill based upon the rewritten utterance.

19. The method of claim 14, wherein the suggested entity is a partial name, the method further comprising:
executing a second search over the computer-readable conversation history of the multi-turn dialogue based upon the properties of the suggested entity;
identifying a full name of the suggested entity based upon search results for the second search, wherein the written utterance further includes the full name of the suggested entity.

20. The method of claim 14, wherein the rewritten utterance is a question.

* * * * *